United States Patent
Jadidian et al.

(10) Patent No.: US 12,158,515 B2
(45) Date of Patent: Dec. 3, 2024

(54) RF RETROREFLECTOR BASED CONTROLLER TRACKING FOR VR HEADSETS

(71) Applicant: MICROSOFT TECHNOLOGY LICENSING, LLC, Redmond, WA (US)

(72) Inventors: Jouya Jadidian, Los Gatos, CA (US); Scott Francis Fullam, Palo Alto, CA (US); Rubén Caballero, San Jose, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 347 days.

(21) Appl. No.: 17/480,939

(22) Filed: Sep. 21, 2021

(65) Prior Publication Data
US 2023/0089734 A1    Mar. 23, 2023

(51) Int. Cl.
G01S 13/75    (2006.01)
G01S 7/03    (2006.01)
G01S 7/41    (2006.01)

(52) U.S. Cl.
CPC .............. *G01S 13/75* (2013.01); *G01S 7/034* (2013.01); *G01S 7/41* (2013.01)

(58) Field of Classification Search
None
See application file for complete search history.

(56) References Cited

U.S. PATENT DOCUMENTS

2018/0361232 A1*  12/2018  Mallinson ............... A63F 13/98
2021/0232235 A1    7/2021  Regani et al.
2023/0072423 A1*  3/2023  Osborn .................. G16H 20/30

FOREIGN PATENT DOCUMENTS

EP      3177983 A1    6/2017
WO      2021016334 A1    1/2021
WO      2021048516 A1    3/2021

OTHER PUBLICATIONS

U.S. Appl. No. 15/971,817, filed May 4, 2018.
U.S. Appl. No. 15/972,048, filed May 4, 2018.
U.S. Appl. No. 15/972,054, filed May 4, 2018.
"International Search Report and Written Opinion Issued in PCT Application No. PCT/US22/038610", Mailed Date: Nov. 9, 2022, 15 Pages.

* cited by examiner

*Primary Examiner* — Whitney Moore
(74) *Attorney, Agent, or Firm* — Workman Nydegger

(57) ABSTRACT

Systems and methods are provided for tracking a passive controller system using an active sensor system within a mixed-reality environment. The passive controller system includes a body configured to be held in a hand of a user, as well as a plurality of retroreflectors that collectively provides at least 180 degrees of reflecting surface for reflecting a radar signal in at least 180 degrees of spherical range when the passive controller system is positioned within a predetermined distance from a source of the radar signal and with an orientation that is within the at least 180 degrees of spherical range relative to the source of the radar signal. Signals transmitted to the passive controller and reflected back from the passive controller are used to calculate the position and orientation of the passive controller system relative to the active sensor system.

15 Claims, 19 Drawing Sheets

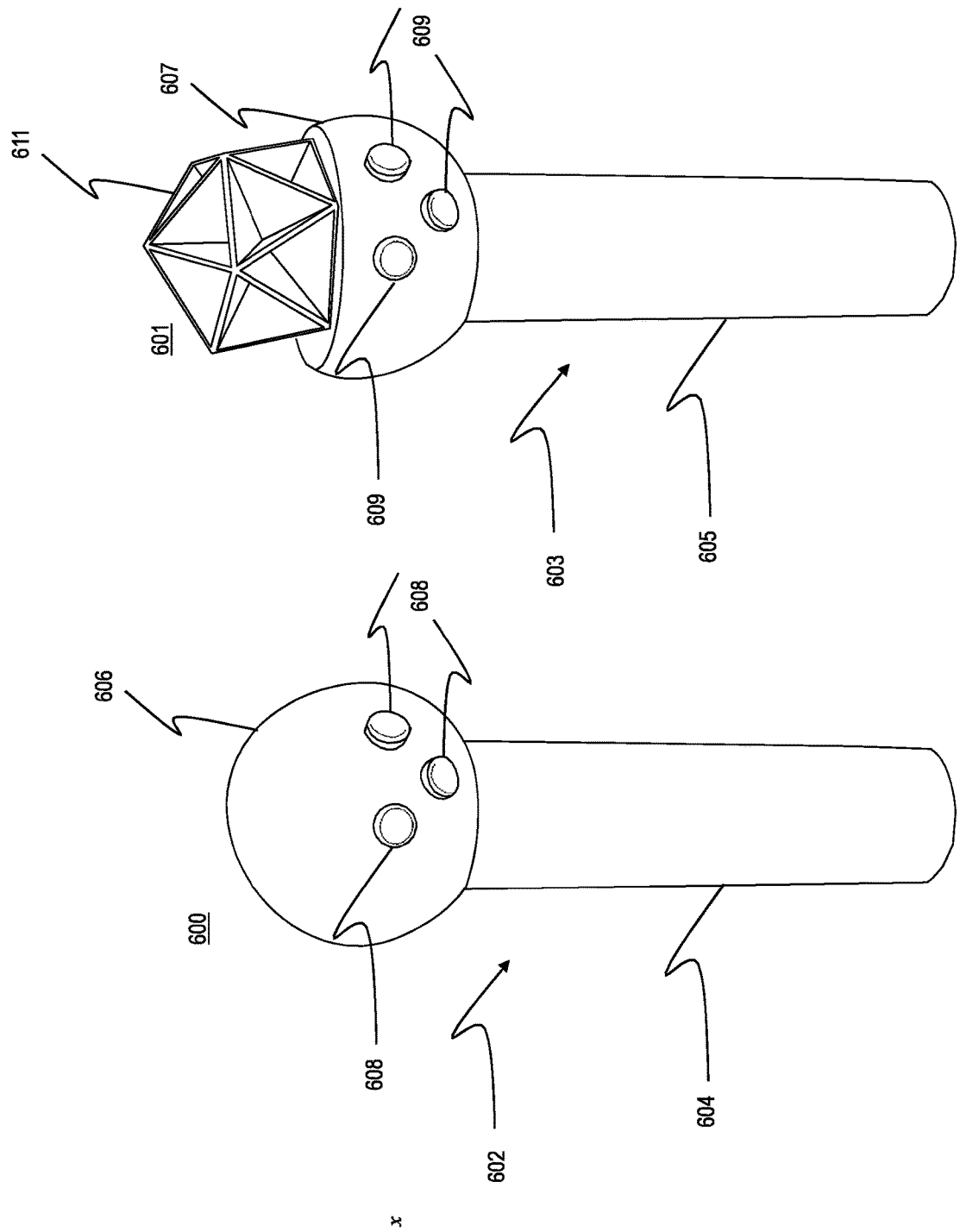

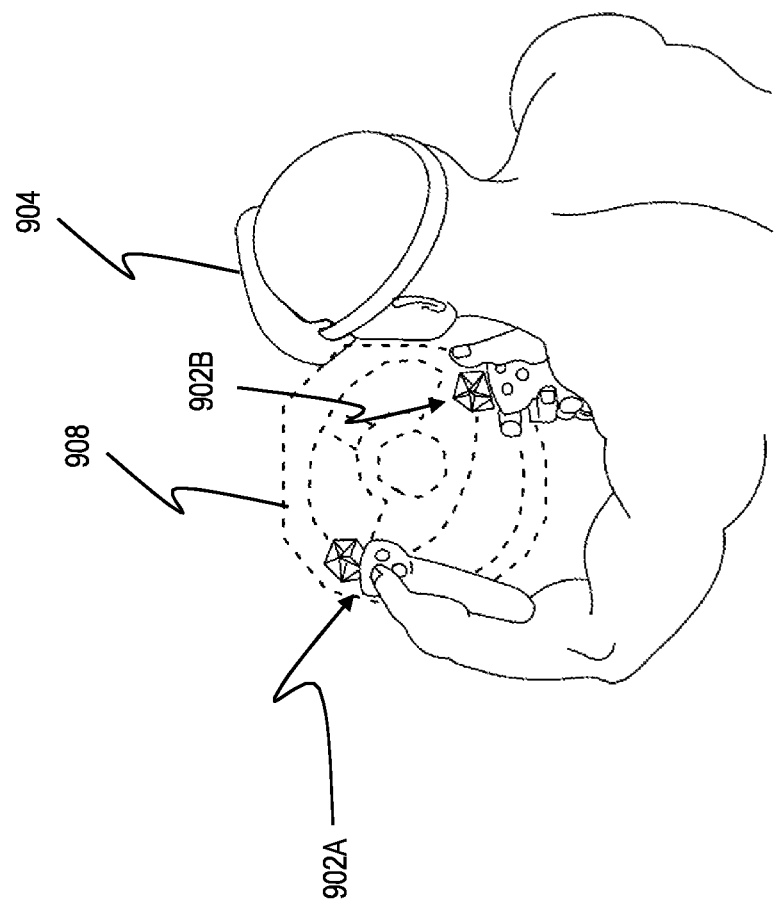
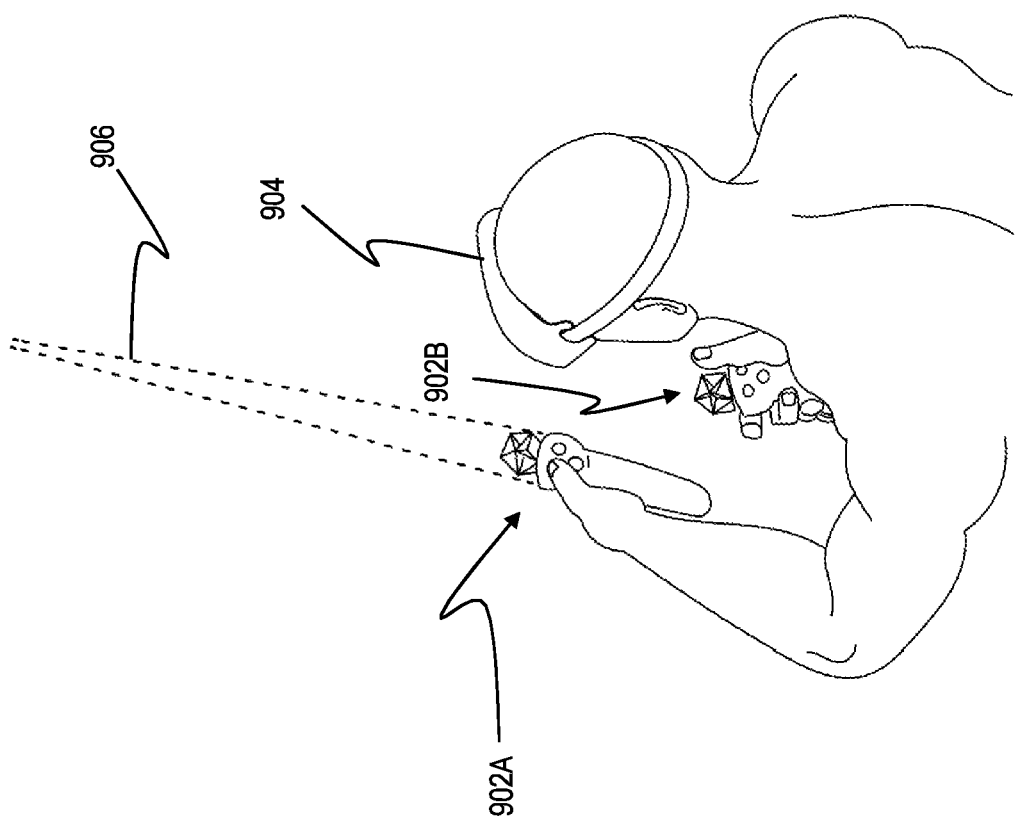

RF RETROREFLECTOR BASED CONTROLLER TRACKING FOR VR HEADSETS

BACKGROUND

Mixed-reality systems, such as virtual reality systems and augmented reality systems have received significant attention because of their ability to create unique experiences for their users. Virtual reality systems provide experiences in which a user is fully immersed in a virtually represented world, typically through a virtual reality headset or head-mounted device (HMD) that prevents the user from seeing objects located in the user's real environment. Augmented reality systems provide a user with experiences that allow the user to interact with both virtual content and real objects located in the user's environment. For example, virtual objects are virtually presented to the user within the user's own real environment such that the user is able to perceive the virtual objects in relation to physical or real objects.

Typically, users perceive or view the virtual reality or augmented reality through an enclosed visual display (for virtual reality) or transparent lens (for augmented reality). Users can then interact with the perceived reality through different user input controls, as located on a user controller, or set of user controllers. In order for the user to interact well within the mixed-reality, the mixed-reality system must be able to track the user inputs, and more specifically, the user controllers, by at least tracking the orientation and the position of one or more user controllers relative to user's display (e.g., HMD).

Current methods and systems for tracking the user controllers are expensive because the user controllers must have an active tracking system that is in real time communication with the mixed-reality system.

Accordingly, there is an on-going need and desire for improved systems, methods, and devices for user controller tracking, and particularly, for improved systems, methods, and devices that can be utilized for detecting the orientation and position of the user controller relative to a mixed-reality system.

The subject matter claimed herein is not limited to embodiments that solve any disadvantages or that operate only in environments such as those described above. Rather, this background is only provided to illustrate one exemplary technology area where some embodiments described herein may be practiced.

BRIEF SUMMARY

Disclosed embodiments include systems, methods, and devices that include and or that are configured to facilitate the tracking of a passive controller system using radio frequency retroreflectors.

Some disclosed systems include a passive controller system having a body configured to be held in a hand of a user and that incorporates a plurality of retroreflectors. The retroreflectors are attached to the body in a configuration that provides at least 180 degrees of reflecting surface for reflecting a radar signal in at least 180 degrees of spherical range when the passive controller system is positioned within a predetermined distance from a source of the radar signal, with an orientation that is within the at least 180 degrees of spherical range relative to the source of the radar signal.

Disclosed systems also include active sensor systems configured to track a relative orientation and a relative position of a passive controller system when the passive controller system is positioned within a predetermined distance of the active sensor system. In some instance, the active sensor system includes one or more monostatic transmitters configured to transmit signals within a spherical range and one or more monostatic receivers configured to receive one or more reflecting signals that are reflected from a plurality of retroreflectors attached to a passive controller system that is being tracked by the active sensor system. The plurality of retroreflectors on the passive controller system are configured to reflect the one or more signals to the one or more monostatic receivers when the passive controller system is positioned within the predetermined distance of the active sensor system, regardless of orientation and position within the predetermined distance of the active sensor system.

The active sensor system also includes one or more processors for processing the one or more signals reflected from the plurality of retroreflectors and received by the one or more monostatic receivers to determine the relative position and the relative pose or orientation of the passive controller system relative to the active sensor system.

Some of the disclosed methods include detecting an orientation and position of a passive controller system relative to an active sensor system when the passive controller is positioned within a predetermined distance of the active sensor system and based on one or more signals that originate from the active sensor system and that are reflected back to the active sensor system from the passive controller system.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages will be set forth in the description which follows, and in part will be obvious from the description, or may be learned by the practice of the teachings herein. Features and advantages of the invention may be realized and obtained by means of the instruments and combinations particularly pointed out in the appended claims. Features of the present invention will become more fully apparent from the following description and appended claims or may be learned by the practice of the invention as set forth hereinafter.

BRIEF DESCRIPTION OF THE DRAWINGS

In order to describe the manner in which the above-recited and other advantages and features can be obtained, a more particular description of the subject matter briefly described above will be rendered by reference to specific embodiments which are illustrated in the appended drawings. Understanding that these drawings depict only typical embodiments and are not therefore to be considered to be limiting in scope, embodiments will be described and explained with additional specificity and detail through the use of the accompanying drawings in which:

FIGS. 6A-6B illustrates front views of various example embodiments of a passive controller system.

FIGS. 9A-9B illustrate various example embodiments of a passive controller system configured to project different virtual objects associated with the passive controller system.

DETAILED DESCRIPTION

Embodiments disclosed herein relate to systems, methods, and devices that are configured to facilitate tracking of passive controller systems, and even more particularly, for systems, methods, and devices that can be utilized to track passive controller systems using radio frequency retroreflectors and an active sensor system.

The disclosed embodiments provide many technical advantages over existing systems, methods, and devices. For example, the disclosed passive controllers do not necessarily need line-of-sight to the active sensor system to be tracked, as the signals sent from and reflected back to the active sensor system from the passive controller can sometimes pass through materials that would obscure camera imaging required for line-of-sight tracking.

Furthermore, the active sensor system is able to function on low power while still meeting signal transmission requirements. These lower power requirements, particularly for the passive controller is an improvement over devices that require power, such as controllers with powered IMU tracking components.

The design of both the passive controller system and the active controller system are relatively inexpensive and highly customizable in terms of the range of operation, the size of the passive controller system, and the frequency of the signal being transmitted by the active sensor system. Beneficially, in use applications for mixed-reality systems, the passive controller system is designable as a hand-held remote control that is trackable within an arm's length of the user's active sensor system (as configured as an HMD), such that the active sensor system is able to track the position and orientation (also referred to herein as pose) of the passive controller system with sub-millimeter and sub-radian accuracy.

Figure 1:
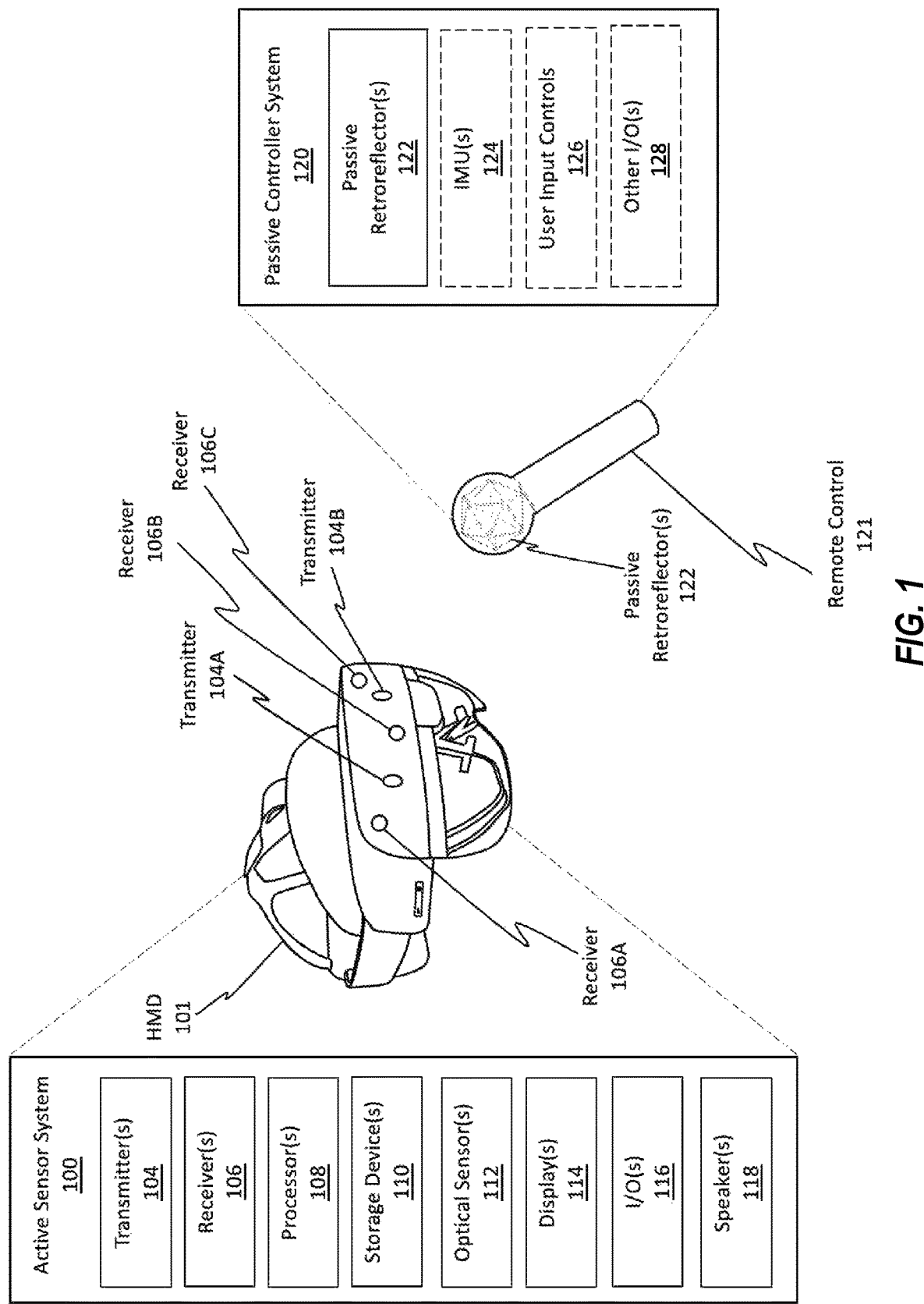
FIG. 1 illustrates an active sensor system and passive controller system that includes and/or that is capable of being utilized to implement the disclosed embodiments.

FIG. 1 illustrates an active sensor system 100 and passive controller system 120 that includes and/or that is capable of being utilized to implement the disclosed embodiments. The active sensor system 100, depicted in FIG. 1 as a head-mounted device (e.g., HMD 101) includes a plurality of transmitters 104 (e.g., transmitter 104A, transmitter 104B, and transmitter 104C) and a plurality of receivers 106 (e.g., receiver 106A and receiver 106B).

The active sensor system 100 is also illustrated as including one or more processor(s) (such as one or more hardware processor(s) 108 and a storage (i.e., storage device(s) 110) storing computer-readable instructions wherein one or more of the hardware storage device(s) 110 is able to house any number of data types and any number of computer-readable instructions by which the active sensor system 100 is configured to implement one or more aspects of the disclosed embodiments when the computer-readable instructions are executed by the one or more processor(s) 108. The active sensor system 100 is also shown including optical sensor(s) 112, display(s) 114, input/output (I/O) device(s) 116, and speaker(s) 118.

FIG. 1 also illustrates the passive controller system 120, depicted as a remote control 121, which includes one or more passive retroreflector(s) 122. In some embodiments, the passive controller system 120 optionally includes one or more inertial measurement units (e.g., IMU(s) 124), user input controls 126 (e.g., user control buttons disposed on the remote control 121), and/or other I/O(s) 128. In some instances, other I/O(s) include haptic feedback, microphones, speakers, optical sensors, light emitting devices (e.g., for light indicators), or other input/outputs.

However, it is noted that the passive controller system 120 does not need to include any IMU or other powered tracking unit to track the orientation and/or position of the controller relative to the active sensor system 100. In fact, in most preferred configurations, the passive controller system 120 does not include and/or does not use the IMU 124 to tack positioning of the passive controller system relative to the active sensor system 100. Instead, these components (e.g., IMU 124) are merely optional and/or may be selectively used for powered and/or supplementary tracking if and/or when it is determined that there is a significant amount of radio interference that might otherwise interfere with the signal transmissions used for the passive controller tracking that is described herein.

In such alternative embodiments, for example, the system can dynamically detect interference, based on analyzing sensor data received at the system and/or based on user input or third party input, and can responsively activate and/or use IMU sensor data from the IMU 124, if one is provided, to perform active tracking.

The controller may also include a separate power supply (not shown) to power any powered components in the passive tracking controller.

Figure 2A:
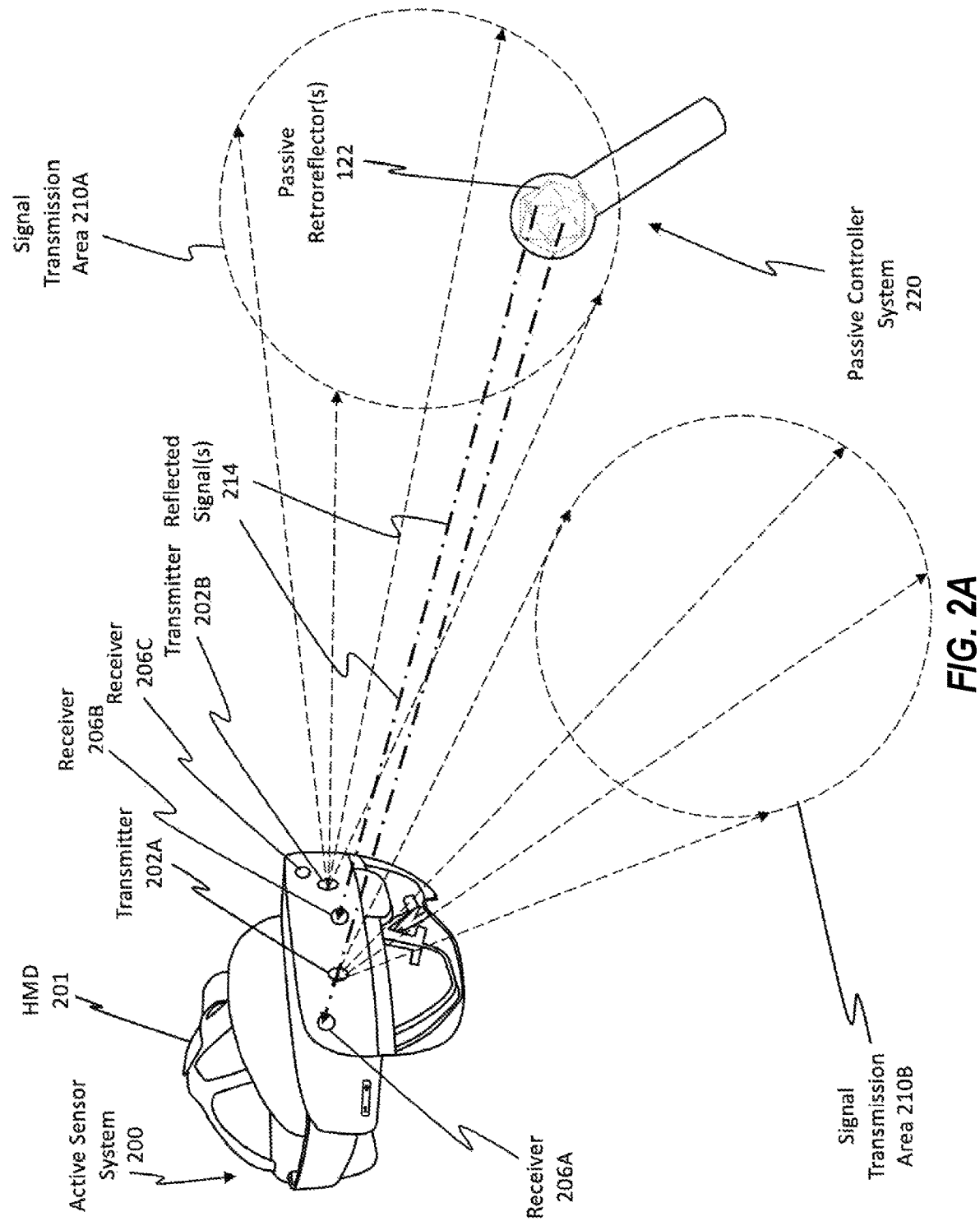
FIGS. 2A-2B illustrates an example embodiment for a using the active sensor system to track the passive controller system within a signal transmission area.
Figure 2B:
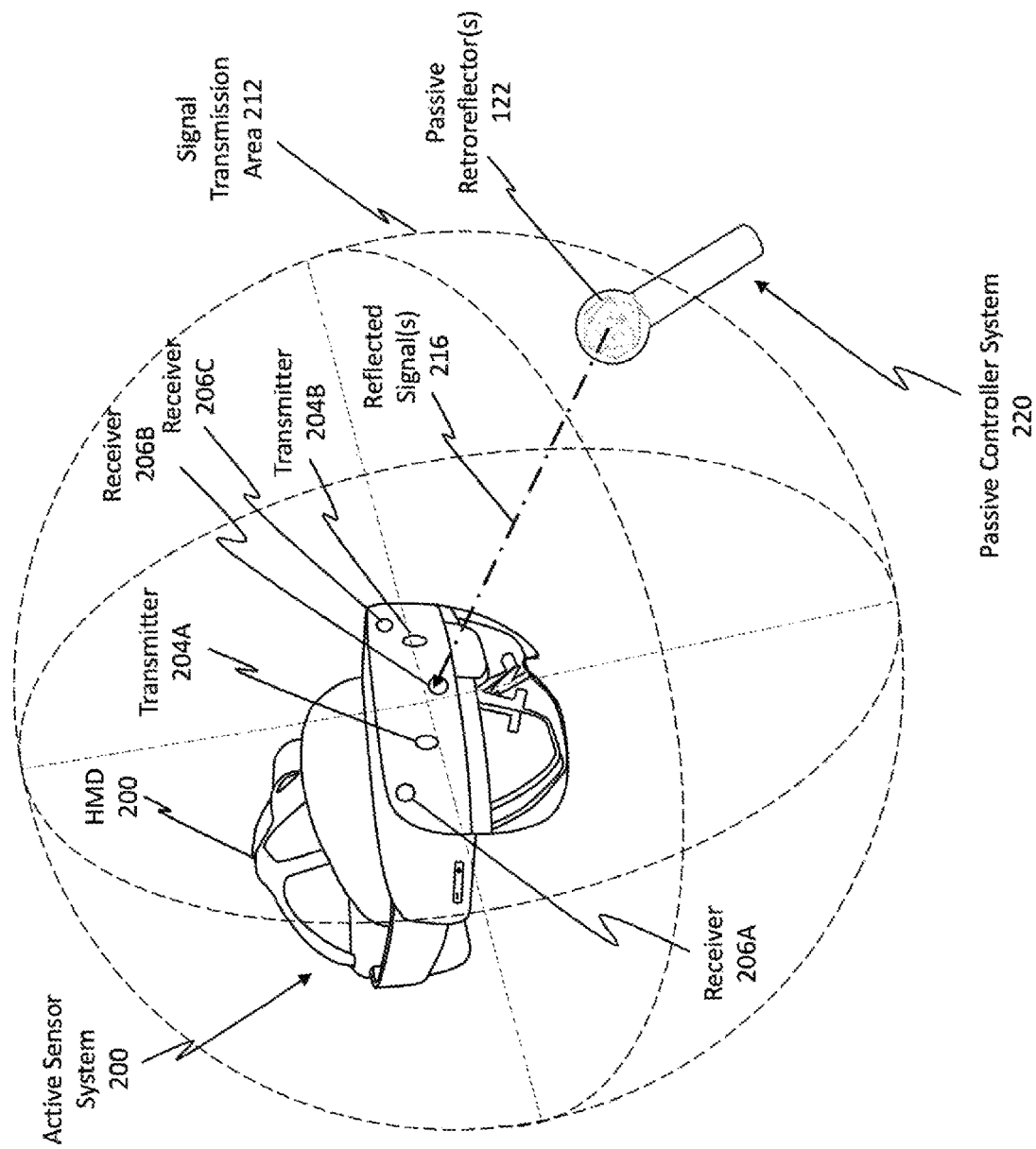

Attention will now be directed to FIGS. 2A-2B, which illustrate various example embodiments for detecting an orientation and a position of a passive controller system 220 relative to an active sensor system 200 that is positioned within a predetermined distance from the passive controller system. In these embodiments, the active sensor system 200 transmits one or more signals (e.g., within signal transmission area 210A and signal transmission area 210B) to the passive controller system 220 and in such a manner that the one or more signals are reflected from the passive controller system back to the active sensor system as one or more reflected signals 214.

The active sensor system 200 (currently depicted as HMD 201) is configured to transmit the one or more signals from a plurality of monostatic transmitters (e.g., transmitter 202A and/or transmitter 202B) of the active sensor system 200 in a relatively omni-directional signal transmission area (e.g., signal transmission area 210A and/or signal transmission area 210B) with a directionality towards a front of the active sensor system 200, towards a passive controller system 220 that is located within a predetermined distance of the active sensor system and signal transmission area.

The active sensor system 200 is also configured receive and detect the one or more reflected signals 214 reflected back from a plurality of retroreflectors (e.g., passive retroreflector(s) 122) attached to the passive controller system 220. The plurality of retroreflectors is configured on the passive controller system 220 to reflect the one or more signals back to the active sensor system 200 as the one or more reflected signals 214 irrespective of orientation or position of the passive controller system when the passive controller system is positioned within the predetermined distance of the active sensor system within to signal transmission area.

The one or more reflected signals 214 is/are received and detected by one or more receivers of the active sensor system 200 (e.g., receiver 206A, receiver 206B and/or receiver 206C) The active sensor system 200 is then able to calculate/determine the orientation and the position of the passive controller system 220 relative to the active sensor system based on the one or more originating signals within signal transmission area (e.g., 210A and/or 210B) and the one or more reflected signals 214.

As shown in FIG. 2A, the one or more signals transmitted by the transmitter 202A and/or transmitter 202B are transmitted within signal transmission area 210A and/or signal transmission area 210B. As shown in FIG. 2A, signal transmission area 210A and signal transmission area 210B are separate and discrete signal transmission areas. In some embodiments, signal transmission area 210A and signal transmission area 210B at least partially and/or completely overlap. In other embodiments, the signal transmission area 210A and signal transmission area 210B do not overlap.

As shown in FIG. 2B, in some embodiments, the active sensor system 200 includes a plurality of transmitters (e.g., transmitter 204A and transmitter 204B) which are configured to transmit one or more signals within a continuous signal transmission area 212 which covers at least a hemisphere of spherical range for signal transmission to the passive controller system 220, when the passive controller system 220 is located within a particular distance relative to the active sensor system 200. The plurality of retroreflectors 222 of the passive controller system 220 is configured to reflect the one or more signals within the signal transmission area 212 as one or more reflected signals 216 back to the plurality of receivers of the active sensor system 200.

In other embodiments, the signal transmission area surrounds the active sensor system 200 by more than a single hemisphere, and in some instances, by a full spherical coverage surrounding the active sensor system 200, such as by positioning more of the transmitters around different portions of the HMD 200 and/or auxiliary devices that are in communication with the HMD 200.

Figure 3:
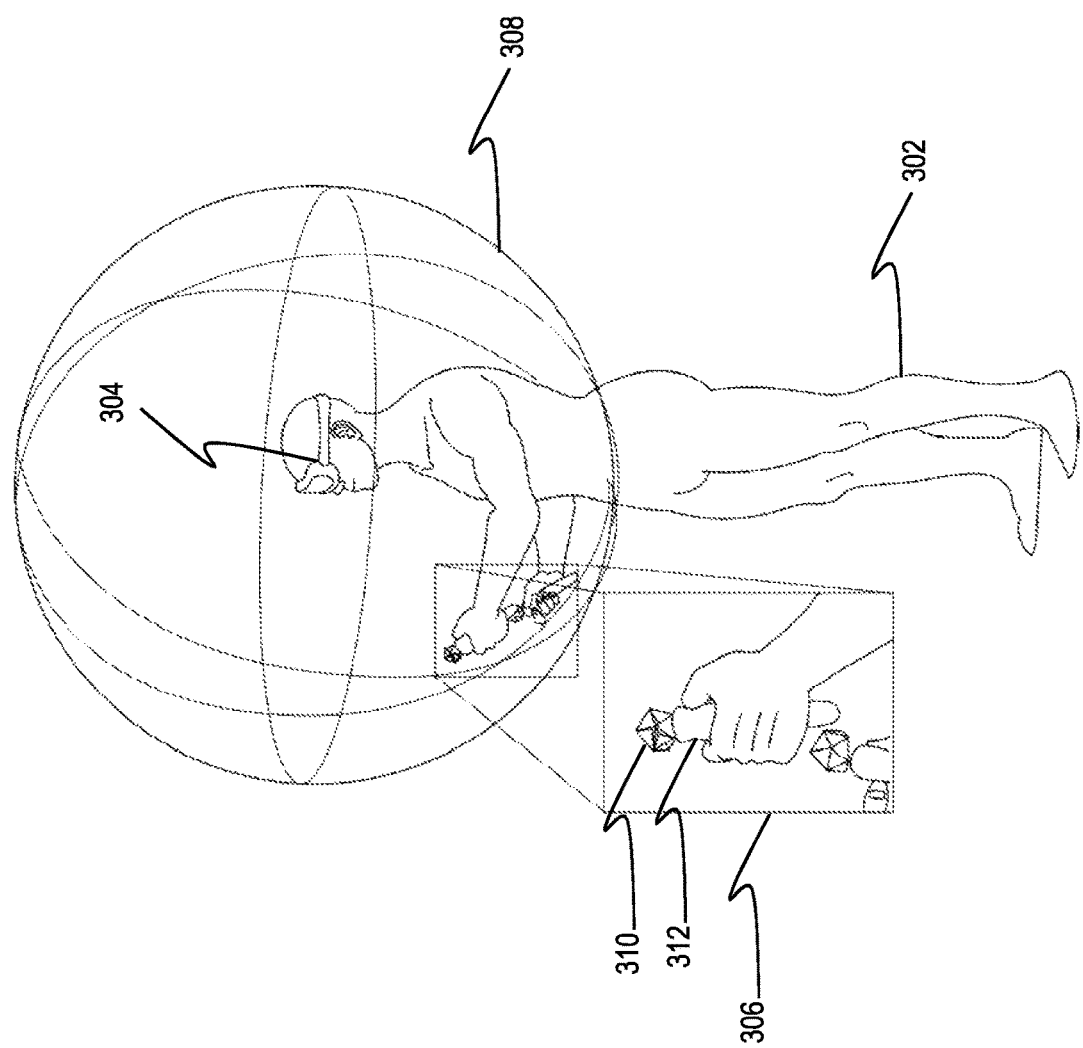
FIG. 3 illustrates an example embodiment for using an active sensor system to track a passive controller system within a predetermined distance of the active sensor system.

Attention will now be directed to FIG. 3, which illustrates an example embodiment for using an active sensor system 304 to track a passive controller system 306 within a predetermined distance 308 of the active sensor system 304.

The passive controller system 306 includes a body 312A configured to be held in a hand of a user 302 and to be moved with the hand of the user in six degrees of freedom (6DOF). In this regard, the passive controller system 306 can be viewed as a 6DOF controller.

The passive controller system 306 also includes a plurality of retroreflectors 310 attached to the body 312 in a configuration that provides at least 180 degrees of reflecting surface for reflecting a radar signal in at least 180 degrees of spherical range when the passive controller system is positioned within a predetermined distance 308 from a source of the radar signal with an orientation that is within the at least 180 degrees of spherical range relative to the source of the radar signal. In some embodiments, the passive controller system is positioned within a predetermined distance 308 from a source of the radar signal with an orientation that is within 360 degrees of spherical range relative to the source (e.g., active sensor system 304) of the radar signal.

In some embodiments, the predetermined distance 308 between the active sensor system 304 and the passive controller system 306 is within a range (or having a radius) of about 0.01 meters to about 4 meters. However, in some alternative embodiments, the range of the predetermined distance 308 can also extend beyond 4 meters and/or be within less than 0.01 meters.

It should be appreciated that the signals that are generated and transmitted by the active system as illustrated in FIGS. 2A-2B are tunable depending on the size of the passive controller system and/or the predetermined distance between the passive controller system and the active sensor system. For example, the signal ranges from about 60 GHz to about 100 GHz, or more broadly, between 24 GHz to about 110 GHz. In particular, 60 GHz is an appropriate radio frequency because it maintains signal power through short ranges, such as an arm's length for a user (e.g., between 0.1 to 1.1 meters). 60 GHz is also usable for longer ranges, up to approximately 4 meters. Increasing the radio frequency (e.g., 110 GHz) allows the retroreflectors to be smaller, like a ping pong ball size for the plurality of retroreflectors. These frequencies and respective retroreflector sizes allow the active sensor system to obtain sub-millimeter and sub-radian tracking accuracy for the passive controller system.

The predetermined distance can be increased, especially if the plurality of retroreflectors is placed inside the passive controller system at a length that is further away from the user's arms and hands. Where the passive controller system is configured as an elongated remote control (or as an object-based remote control such as a lightsaber or sword), when the retroreflectors are placed toward a distal end of the elongated remote control away from the user's hand, there is decreased interference/interruption within the line-of-sight for the signal reflection, as well as less likelihood of the user touching or shorting out portions of the retroreflector(s).

Figure 4:
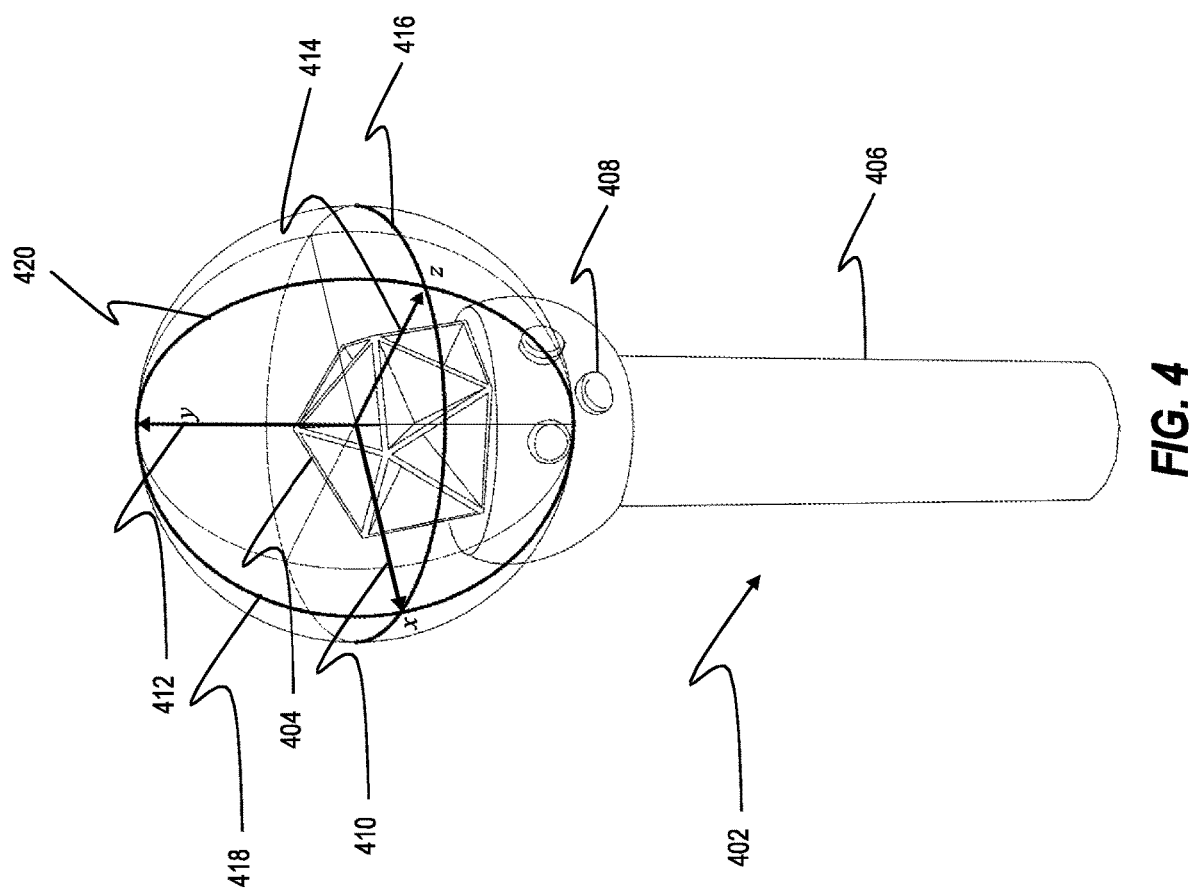
FIG. 4 illustrates an example embodiment of a passive controller system that is trackable within six degrees of freedom of movement.

Attention will now be directed to FIG. 4, which illustrates an example embodiment of a passive controller system 400 that is trackable within six degrees of freedom of movement. As shown in FIG. 4, the passive controller system 400 includes a controller body 402 comprising a handle base 406 and a plurality of user input controls 408 disposed on an outer portion of the controller body. The passive controller system 400 also includes a plurality of retroreflectors 404 which are configured to reflect one or more signals generated by an active sensor system back to the active sensor system. It should be appreciated that the controller body 402 is comprised of a material that is radio transparent, such that it allows the signal being transmitted from the active sensory system to reach one or more retroreflectors housed inside the controller body 402.

The passive controller system 400 is configured so that a user is able to hold the controller body 402 with one or more hands in order to move the passive controller system in at least six degrees of movement. For example, a user is able to move the passive controller system 400 in an x direction 410, a y direction 412, and/or a z direction 414. These cardinal directions are used to represent and/or determine a position of the passive controller system. Furthermore, the user is able to change the orientation (pitch, yaw, and/or roll) of the passive controller system at different positions.

The user is able to move the passive controller system 400 in different pitch orientations 418 about a pitch axis (e.g., z axis), in different roll orientations 420 about a roll axis (e.g., the x axis), and/or in different yaw orientations 416 about a yaw axis (e.g., they axis). Thus, the user is able to change the pose (i.e., orientation) of the passive controller system 400 by tilting, turning, and/or rotating the passive controller system 400. The different orientations of the passive controller system 400 determine the orientation and effective signal reflection surface area of the plurality of retroreflectors 404.

While the passive controller system 400 may have a total signal reflection surface area, depending on the orientation of the passive controller system 400, the plurality of retroreflectors may be positioned and/or oriented such that the usable signal reflection surface area is less than the total reflection surface area available.

In some instances, the plurality of retroreflectors 404 are disposed in a configuration on and/or within the passive controller system 400 in order to maximize the usable signal reflection surface area relative to the active sensor system. For example, the plurality of retroreflectors 404 are disposed on and/or within the passive controller system 400 such that at least one signal generated by an active sensor system is reflected back to the active sensor system irrespective of the orientation and/or position of the passive controller system 400 when the passive controller system 400 is located within a predetermined distance of the active sensor system.

The user input controls 408 are disposed so that while the user holds the passive controller system 400, the user is able to use one or more fingers to interact with the user input controls 408 to provide user input to the passive controller system 400 for controlling and/or for interacting with objects in a mixed-reality environment, for example. In particular, the user input generated by the controls is used to represent and/or affect user interactions with a mixed-reality in which the active sensor system and passive controller system 400 are being utilized. While the passive controller system 400 may further include one or more processor(s) and/or one or more hardware storage device(s) to facilitate the communication of the user input to the active sensor system and/or other computing system, the tracking functionality (e.g., the plurality of retroreflectors 404) remain a passive tracking component.

Figure 5:
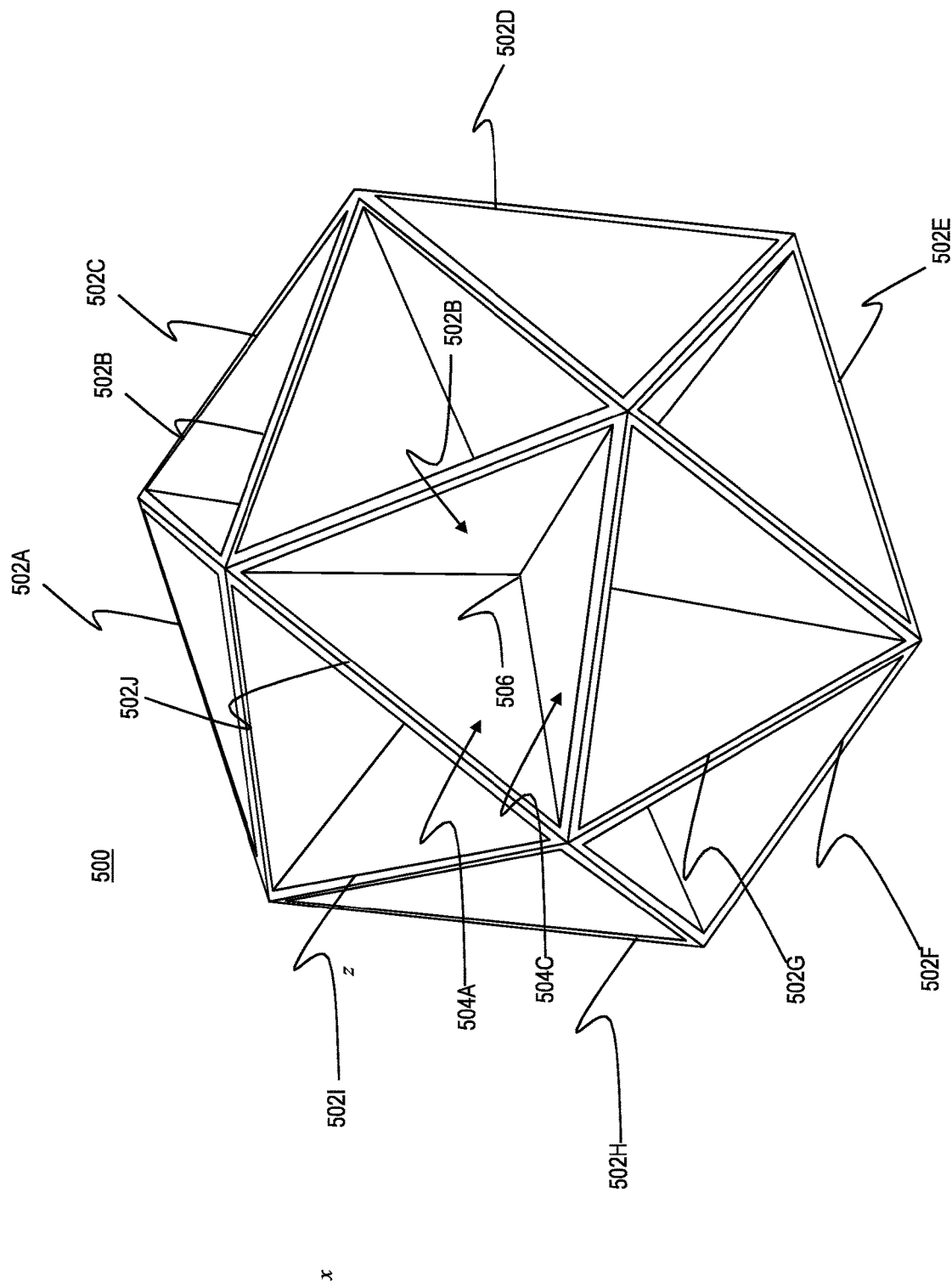
FIG. 5 illustrates an example embodiment of a plurality of retroreflectors.

FIG. 5 illustrates an example embodiment of a plurality of retroreflectors 500. As shown in FIG. 5, the plurality of retroreflectors 500 comprises retroreflector 502A, retroreflector 5026, retroreflector 502C, retroreflector 502D, retroreflector 502E, retroreflector 502F, retroreflector 502G, retroreflector 502H, retroreflector 502I, retroreflector 502J, and/or one or more other retroreflectors. In some embodiments, each retroreflector (e.g., retroreflector 502J) comprises a plurality of reflective surfaces (e.g., reflective surface 504A, reflective surface 504B, and reflective surface 504C). In such embodiments, one or more retroreflectors are configured as corner retroreflectors, wherein the plurality of reflective surfaces are configured as orthogonally connected planes, partially forming a pyramid structure and/or prism having a center point 506.

In some embodiments, each retroreflector of the plurality of retroreflectors comprises a substantially similar surface area and dimensional size. In some instances, each individual retroreflector is configured as a corner reflector comprising at least three or more reflective planes. At least one point of each plane is attached to a point of another plane, such that the corner reflector has at least one single point or apex. The angle at which the planes connect is tunable based on the frequency of operation and size of the corner reflectors.

In some embodiments, the plurality of retroreflectors comprises a single integrated reflector unit that is detachably connected to the body. Additionally, or alternatively, one or more retroreflectors of the plurality of retroreflectors 500 is individually detachable from one or more other retroreflectors. The plurality of retroreflectors is configurable to provide 360 degrees of signal reflection surface area. Additionally, or alternatively, the plurality of retroreflectors is configurable to provide various ranges of total signal reflection surface area, including at least 90 degrees, at least 180 degrees, and/or at least 270 degrees of signal reflection surface area.

As shown in FIG. 5, each retroreflector of the plurality of retroreflectors is attached to the body such that an angle of reflection of each retroreflector is a unique angle of reflection that is non-overlapping with angles of reflection of at least two different retroreflectors in the plurality of retroreflectors. In some embodiments, a first angle of reflection of a first retroreflector of the plurality of retroreflectors overlaps with a second angle of reflection of a second retroreflector of the plurality of retroreflectors.

As shown in FIG. 5, each retroreflector of the plurality of retroreflectors is composed of a same material. However, it should be appreciated that each individual retroflector and/or one or more reflective surfaces of an individual retroreflector is customizable, such that different reflective materials are used in different portions of the plurality of retroreflectors.

In either configuration (the same material or different materials), the material(s) used for the plurality of retroreflectors are more reflective than skin (i.e., the user's arm and/or hand). The material(s) are also more reflective than the material(s) of other objects within the predetermined range. The retroreflectors are more reflective than other human and non-human objects in part because the cross section that the radar "sees" is proportional to the side length of an individual retroreflector. Thus, the retroreflector is tunable to overcome different sized objects within a known environment in which the passive controller system is to be used. Because the effective cross-section of the retroreflector (e.g., as configured as a corner reflector) is larger than an object that may be appearing in the line-of-sight (e.g., a hand or forearm) between the passive controller system and the active sensor system, the active sensor system is still able to track the location of the passive controller, because the signal will still be reflected from the passive controller system at a greater magnitude than from the interfering object.

In some embodiments, the material used to either form or coat the retroreflectors has a metal-level conductivity or other conductivity of at last $10^5$ $\Omega^{-1}$ $m^{-1}$. Suitable material(s) for the retroreflector coating include, for example, platinum, gold, silver, and copper. However, other metals and reflective materials can also be use. In some instances, one or more of the retroreflectors are composed of a solid metal. In other instances, the retroreflector(s) are composed of a non-metal base material (e.g., a plastic) and are coated with a tape, laminate, or paint that is reflective or at least more reflective than the underlying base material.

In some embodiments, the plurality of connected retrore-flectors comprise a retroreflector assembly that includes a plurality of adjacently positioned retroreflectors that are positioned in direct contact with each adjacent retroreflector, so as to not provide any open gaps or spaces between the adjacent retroflectors and such that the effective surface area of reflection provided by the connected retroreflectors is relatively continuous within at least a spherical range of reflectivity surrounding the retroreflector assembly.

FIGS. 6A-6B illustrates front views of various example embodiments of a passive controller system. As shown in FIG. 6A, the passive controller system 600 includes a controller body 602 comprising a handle base 604 and a top portion 606, wherein user input controls 608 are disposed on the controller body 602 on and/or near the top portion 606. In such embodiments, the passive controller system 600 includes a plurality of retroreflectors (not visible in FIG. 6A) that is encapsulated within a housing of the body and such that the plurality of retroreflectors is not externally visible from the controller body 602. While not being visible, the retroreflectors are still capable of reflecting signals received at the controller (such that the incoming and reflecting signals are enabled to pass through the relatively non-reflective housing of the body). To enable such a configuration, the controller body is composed of a relatively non-reflective material, such as a non-metallic material like plastic.

As shown in FIG. 6B, passive controller system 601 includes a controller body 603 comprising a handle base 605 and a top portion 607, wherein user input controls 609 are disposed on the controller body 603 on and/or near the top portion 607. In such embodiments, the passive controller system 601 includes a plurality of retroreflectors that is only partially encapsulated within a housing of the body (and/or disposed in a retroreflector assembly 611 on top of the top portion 607 of the body 603) and such that the plurality of retroreflectors in the retroreflector assembly 611 are at least partially and/or totally externally visible from the controller body 603 so as to minimize any possible signal interference from the body, or separate electronic components within the body (e.g., control button processor, power supply, trans-ceiver(s), sensors, etc.).

Figure 7A:
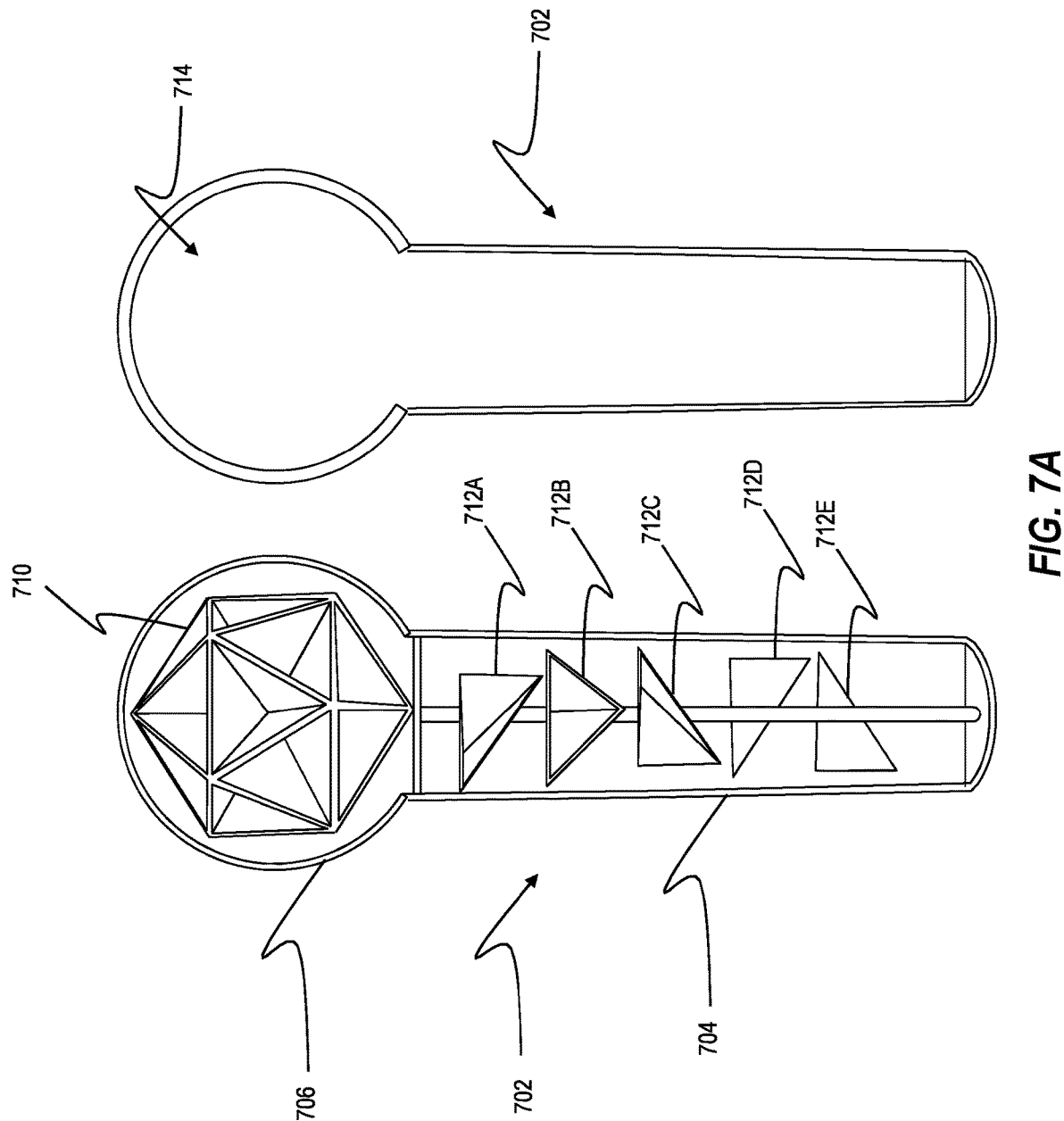
FIG. 7A illustrates a cross-sectional view of an example embodiment of a passive controller system with a plurality of retroreflectors housed inside a body of the passive controller system.

Attention will now be directed to FIG. 7A, which illustrates a cross-sectional view of an example embodiment of a passive controller system 700 with a plurality of retrore-flectors housed inside a body of the passive controller system (e.g., passive controller system 600 of FIG. 6A). As shown in FIG. 7A, the passive controller system 700 includes a controller body 702 comprising a handle base 704 and a top portion 706 which are configured to entirely encapsulate passive retroreflectors.

As shown in this configuration, the passive controller system 700 includes a first plurality of retroreflectors 710 configured as a single discrete and integrally connected retroreflector assembly that provides at least 180 degrees of signal reflection surface area (in some instances, 270 degrees of signal reflection surface area and/or 360 degrees of signal reflection surface area) and a second plurality of retroreflec-tors that are physically separated from each other by at least a small space, and such that they are not integrally connected together into a single integrated assembly. Instead, these retroreflectors are positioned and distributed throughout the handle base 704 to provide a desired coverage of signal reflection surface area based on their collective orientations and positioning within the base. For instance, retroreflector 712A, retroreflector 712B, retroreflector 712C, retroreflector 712D, and/or retroreflector 712E) are each individually disposed and distributed within the handle base 704 of the controller body 702. Each retroreflector of the second plurality of retroreflectors is tunable to provide a different angle of reflection with respect to one or more other retroreflectors, as desired.

In other embodiments, not shown, some the distributed retroreflectors within the base are in direct contact with each other. In some embodiments the retroreflectors and/or ret-roreflector assemblies are redundant relative to other ret-roreflectors and/or retroreflector assemblies incorporated within and/or on the controller to provide overlapping and redundant signal reflection surface areas relative to one or more other retroreflectors of the controller. Such a configuration is beneficial to compensate for and mitigate situations where one or more signals are interfered with or blocked during use of the controller, based on objects being temporarily interposed between the passive controller and the active sensor system (e.g., a metal watch of a user).

In the current configuration, the controller body 702 is shown having empty space 714 which is configured as hollow space inside the controller body 702 in order to house the different retroreflectors. As shown in FIG. 7A, the passive controller system 700 omits any active sensor device and is capable of reflecting the radar signal with the plurality of retroreflectors to a receiver that translates reflected signals from the plurality of retroreflectors to determine a relative position and an orientation of the passive controller system relative to the receiver.

As mentioned earlier, the passive controller system omits any inertial measurement unit (IMU) in some instances. In other alternative embodiments, the passive controller system may optionally include an IMU, wherein the IMU is configured to selectively replace and/or supplement the tracking capability of the active sensor system and provide supporting orientation and position data to the active sensor in order to more accurately and precisely determine the orientation and position of the passive controller system relative to the active sensor system during certain detected conditions, e.g., based on user input, based on bad signal reception at the receivers, based on application requirements, etc.

Beneficially, in most embodiment, the controller is a completely passive tracking controller and such that all of the tracking components (i.e., the retroreflectors) utilized by the controller are unpowered component and do not require any specialized circuitry (even passive circuitry like passive RFID circuit), nor do they require specialized and powered printed circuit board (PCB) components or other processing chips within the controller itself.

Beneficially, because the retroreflectors are passive, the passive controller system 700 does not need to be synchronized and/or remain in network communication with the active sensor system for the tracking processes of the passive controller within a predetermined distance of the active sensor system. Additionally, due the nature of the signals being used for the tracking, the passive controller does not have to remaining within line-of-sight of the active sensor system, as required for image tracking.

As described herein, the first and second pluralities of retroreflectors are attached to and/or within the body of the passive controller are positioned on/in the body of the passive controller to provide 360 degrees of reflecting surface and/or up to 360 degrees of reflecting surface (e.g., <90 degrees of reflecting surface, >90 degrees of reflecting surface, >120 degrees of reflecting surface, >180 degrees of reflecting surface, >270 degrees of reflecting surface, and/or <360 degrees of reflecting surface).

The referenced angular range(s) of reflecting surface facilitate the reflection of the referenced radar signals that are transmitted from a signal source system (e.g., active sensor system and/or a related system) towards the retroreflectors and that are reflected back to a receiver (e.g., the active sensor system and/or related system), irrespective of the orientation of the body relative to the source of the radar signal within the predetermined distance.

Figure 7B:
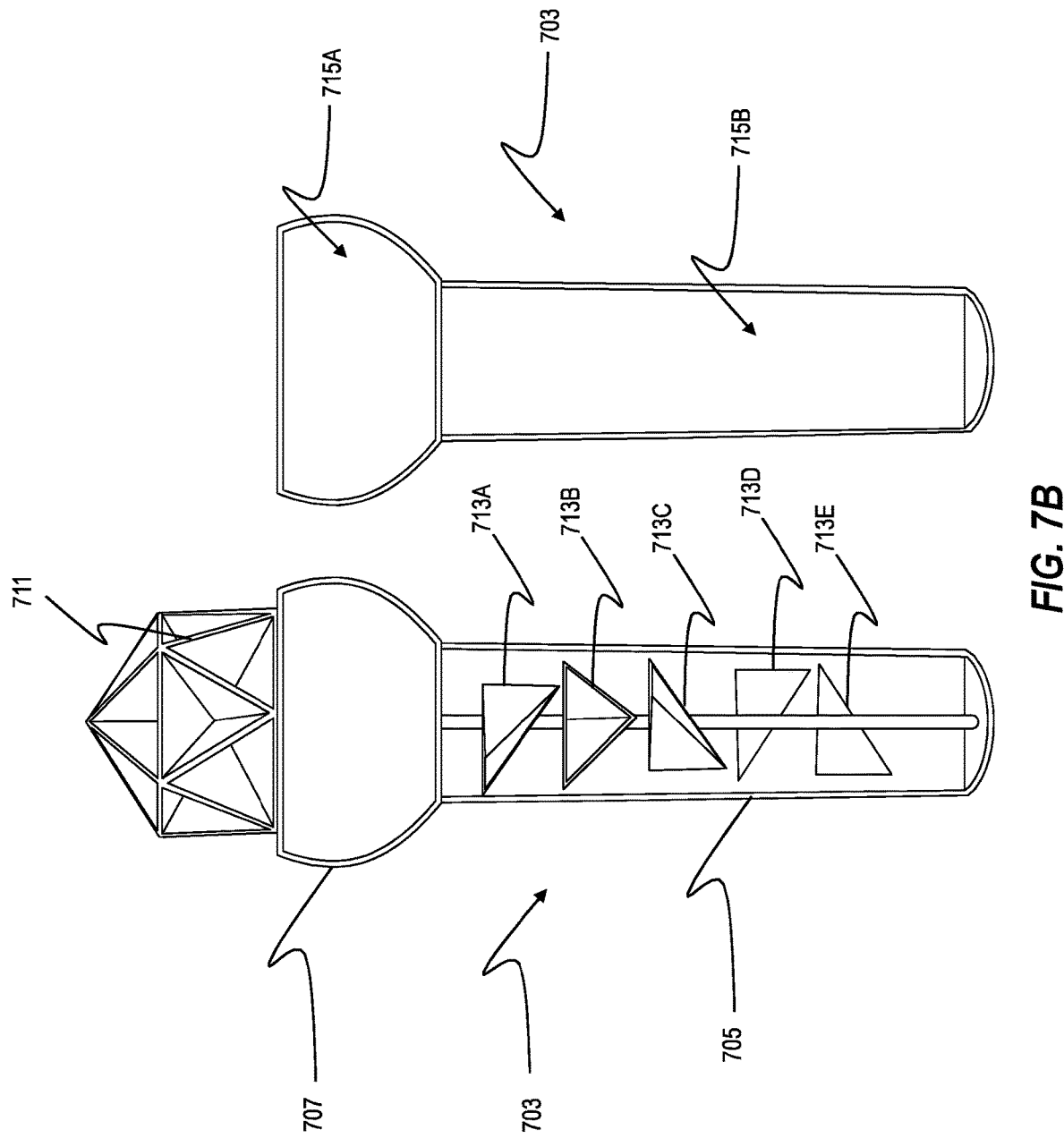
FIG. 7B illustrates a cross-sectional view of an example embodiment of a passive controller system with a plurality of retroreflectors partially housed inside a body of the passive controller system and partially disposed outside of the body of the passive controller.

Attention will now be directed to FIG. 7B, which illustrates a cross-sectional view of an example embodiment of a passive controller system 701 with a plurality of retroreflectors partially housed inside a body of the passive controller system and partially disposed outside of the body of the passive controller. As shown in FIG. 7B, the passive controller system 701 includes a controller body 703 comprising a handle base 705 and a top portion 707.

The passive controller system 701 includes a first plurality of retroreflectors 711 configured as a connected unit of retroreflectors providing at least 180 degrees of signal reflection surface area (in some instances, 360 degrees of signal reflection surface area) and a second plurality of retroreflectors (e.g., retroreflector 713A, retroreflector 713B, retroreflector 713C, retroreflector 713D, and/or retroreflector 713E) which are individually disposed and distributed within the handle base 705 of the controller body 703.

In some instances, at least one of the second plurality of retroreflectors is not in any direct contact with another retroreflector in the controller. Whereas, in this configuration, the first plurality of retroreflectors 711 comprises a single integrated reflector unit that is detachably connected to the body, which each retroreflector has at least one side that is in direct planar contact with a different retroreflector of the plurality of retroreflectors.

Each retroreflector of the second plurality of retroreflectors is tunable to provide a different angle of reflection with respect to one or more other retroreflectors. As shown in FIG. 7B, the second plurality of retroreflectors is distributed throughout a handle base of the body and such that the plurality of retroreflectors includes at least two different retroreflectors that are connected to the body while being separated from each other by at least a space in the body or a physical structure of the body. Additionally, or alternatively, one or more retroflectors of the second plurality of retroreflectors is attachable to the handle base 705 at different locations of the handle base 705.

The controller body 703 is further shown having empty space 715A and empty space 715B which is configured as hollow space inside the controller body 703 in order to house the different retroreflectors.

Notwithstanding the specific embodiments just described, it will be appreciated that the scope of the invention includes passive controllers that are configured with any combination of the first and second plurality of retroreflectors and retroreflector assemblies described above, and which may be exposed and visible, externally from the controller body 703, and/or that are encapsulated within the controller body and/or that are not visible externally from the controller body 703.

Figure 8B:
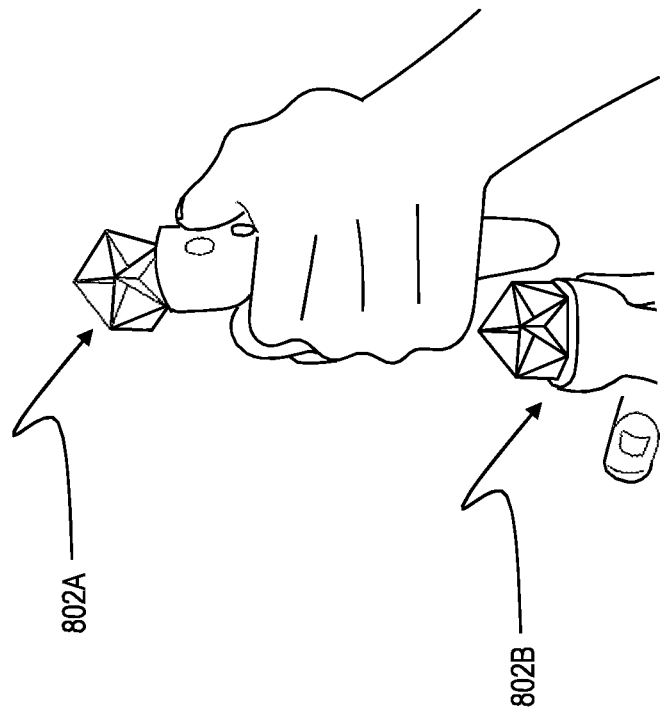
FIGS. 8A-8C illustrate various views of different example embodiments of a multi-controller passive controller system that is trackable without line-of-sight with respect to the active sensor system.
Figure 8A:
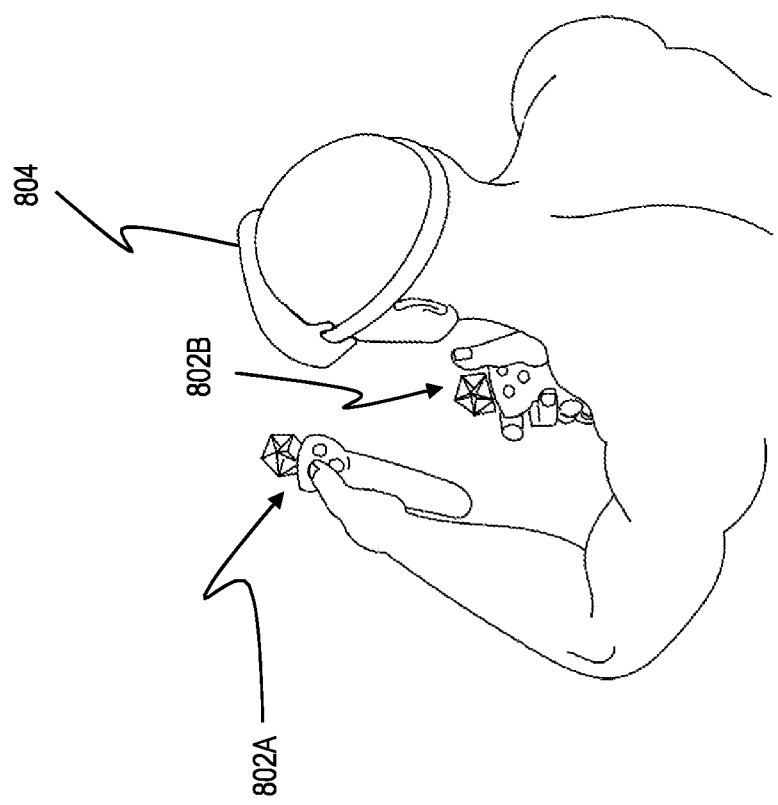
Figure 8C:
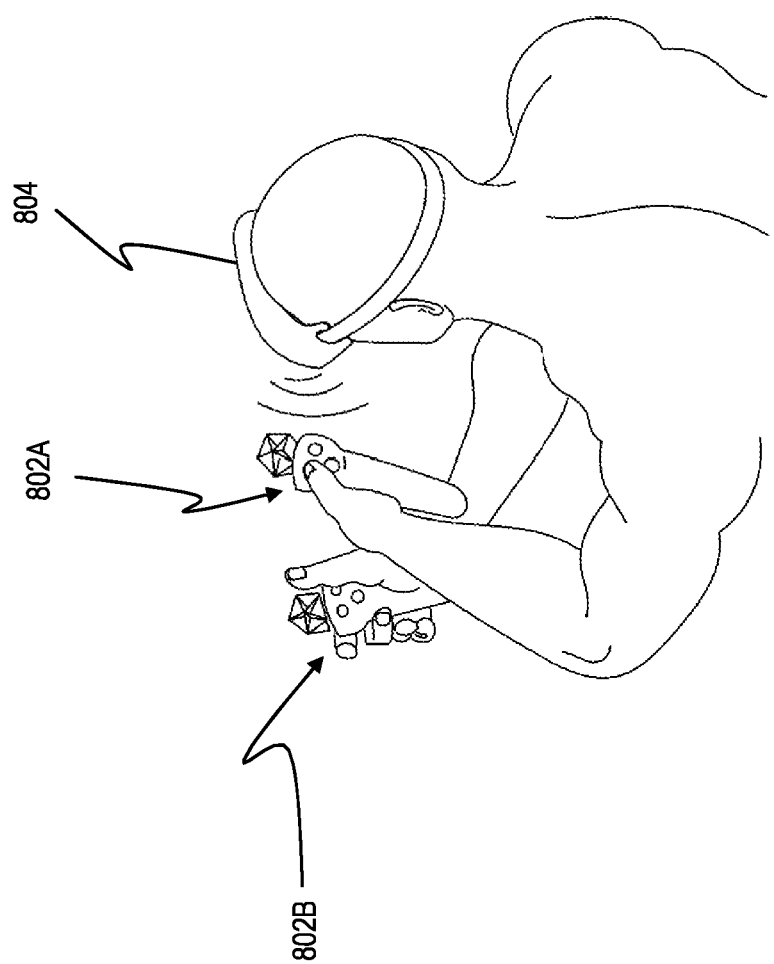

Attention will now be directed to FIGS. 8A-8C, which illustrate various views of different example embodiments of a multi-controller passive controller system that is trackable without line-of-sight with respect to the active sensor system. As shown in FIG. 8A, a passive controller system comprises a first remote control 802A (i.e., left hand controller) configured with a first plurality of retroreflectors and a second remote control 802B (i.e., right hand controller) configured with a second plurality of retroreflectors. The first remote control 802A and second remote control 802B are both within line of sight of the active sensor system 804 (depicted as an HMD).

As shown in FIG. 8B, the second remote control 802B is partially hidden behind the first remote control 802A, such that its line of sight with respect to the active sensor system 804 is interrupted by the first remote control 802A. However, because the signals that are transmitted from the active sensor system 804 are able to pass through physical objects that are less reflective than the retroreflectors of the passive control system, the active sensor system 804 is still able to detect signals reflected from the second remote control 802B in order to determine the orientation and position of both the first remote control 802A and the second remote control 802B.

As shown in FIG. 8C, the first remote control is cross-over the second remote control 802B. However, the active sensor system 804 is configured to detect signals reflected from the respective remote controls and is able to track which remote control is the right-hand control and which remote control is the left-hand control, even when the positions appear to be switched relative to the active sensor system 804. In some instances, the active sensor system used to detect the signal reflected from the respective remote controls is able to track each remote control and identify it as the respective right or left controller due to a signal filtering technique that assumes that one remote control will not suddenly jump to new location. Thus, the path of movement for each controller must be a continuous, smooth path without discontinuity in locations. In this manner, the active sensor system is able to keep track of which remote control is which even if the controllers meet or overlap, as shown in FIG. 8C.

Attention will now be directed to FIGS. 9A-9B, which illustrate various example embodiments of a passive controller system (e.g., remote control 902A and remote control 902B) configured to project different virtual objects (e.g., light saber 906 and/or steering wheel 908) associated with the passive controller system. As shown in FIGS. 9A-9B, the active sensor system 904 is configured project a virtual object associated with the passive controller system in a pose and relative position within a mixed-reality environment virtually displayed to a user based on the orientation and the position of the passive controller system relative to the active sensor system.

In some embodiments, the plurality of retroreflectors of the passive controller system (and/or discrete retroreflectors) are detachable from the remote control and are attachable to a different remote control structured as a physical object (e.g., an actual light saber replica, or actual remote control steering wheel), using different means of attachment, e.g., magnets, adhesives, Velcro® or other hook and loop fasteners, clips, threaded couplings, etc.)

Figure 10:
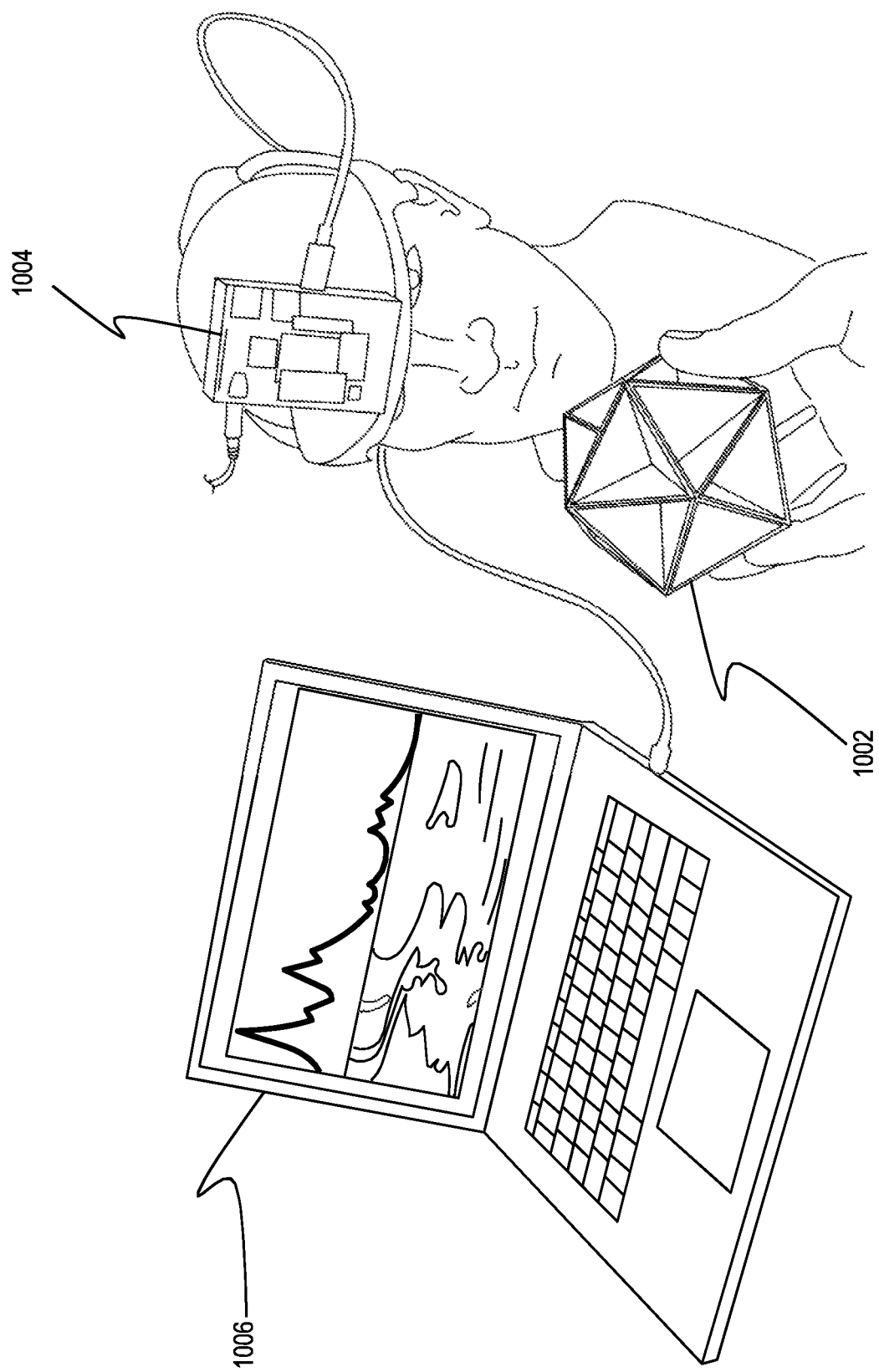
FIG. 10 illustrates an example embodiment of an active sensor system configured as a head-mounted device used to determine a position and orientation of a passive controller system based on a signal generated from and reflected back to the active sensor system by the passive controller system.

Attention will now be directed to FIG. 10, which illustrates an example embodiment of an active sensor system 1004 configured as a head-mounted device used to determine a position and orientation of a passive controller system 1002 (e.g., plurality of retroreflectors) based on a signal generated from and reflected back to the active sensor system 1004 by the passive controller system. The active sensor system 1004 is contained within a headset that is configured to be worn by a user and such that the active sensor system 1004 is configured to track the relative orientation and the relative position of the passive controller system 1002 relative to the headset during use of the headset and the passive controller system.

The reflected signal is detected and tracked via computing system 1006 which is in communication with the active sensor system 1004. In some embodiments, the computing system 1006 includes a display showing the change in reflected signals in order to determine the orientation and position of the passive controller system 1002. In other instances, the computing system 1006 is integrated with the active sensor system 1004 within the HMD.

Figure 11:
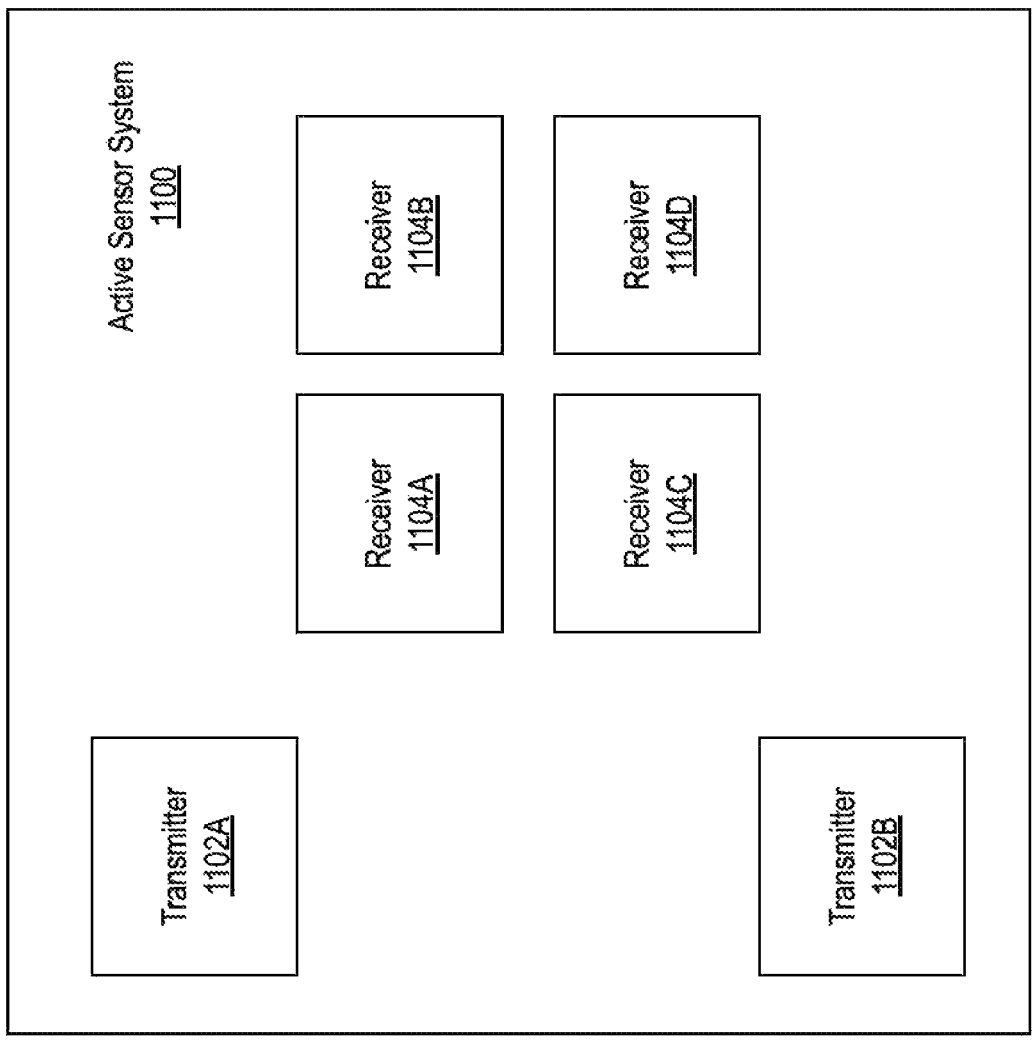
FIG. 11 illustrates an example embodiment of an active sensor system having a plurality of transmitters and a plurality of receivers.

FIG. 11 illustrates an example embodiment of an active sensor system 1100 having a plurality of transmitters and a plurality of receivers. The active sensor system 1100 is configured to track a relative orientation and a relative position of a passive controller system within a predetermined distance of the active sensor system. The active sensor system comprises one or more monostatic transmitters (e.g., transmitter 1102A and/or transmitter 1102B) and is configured to transmit one or more signals within a spherical range.

The active sensor system 1100 also comprises one or more monostatic receivers (e.g., receiver 1104A, receiver 1104B, receiver 1104C, and/or receiver 1104D) configured to receive one or more signals reflected from a plurality of retroreflectors attached to the passive controller system, the plurality of retroreflectors being configured to reflect the one or more signals to the one or more monostatic receivers when the passive controller system is positioned within the predetermined distance of the active sensor system.

It should be appreciated that the active sensor system also comprises one or more processors (e.g., processor(s) 108 of FIG. 1) for processing the one or more signals reflected from the plurality of retroreflectors and received by the one or more monostatic receivers to determine the relative position and the relative orientation of the passive controller system relative to the active sensor system 1100.

As shown in FIG. 11, the one or more monostatic transmitters and one or more monostatic receivers are fixedly positioned with respect to each other in a portrait orientation. In some instances, each receiver comprises a signal reception field of view of about 54 degrees. In this manner, the plurality of receivers is able to cover at least 90 degrees field of view, even more preferably about 180 degrees field of view. In some instances, the plurality of receivers comprises a field of view that is equivalent to the signal transmission area. In some instances, the field of view is larger or greater than the signal transmission area.

In alternative embodiments, the receivers and transmitters are positioned into different configurations on the active sensor system relative to each other and/or include different quantities of transmitters (e.g., 1, 3, 4, or more than 4) and/or different quantities of receivers (e.g., 1, 2, 3, 5, or more than 5). In yet other alternative embodiments, one or more of the transmitters and/or receivers are distributed between different devices of the active sensor system (e.g., a HMD, wired peripheral, remote beacon, remote transceiver and/or other sensor system).

In the current embodiment, the active sensor system of FIG. 11 is configured as a monostatic radar. In this monostatic radar configuration, each receiver is independent of the other receivers, such that the signals being received are processed incoherently. Furthermore, the receiver and transmitter share an antenna. However, in some instances, the active sensor system is configured as a bistatic or multistatic radar. A multi-static radar comprises multiple spatially diverse monostatic or bistatic radar components with a shared area of coverage or field of view.

In some instances, each transmitter in the active sensor system sweeps frequencies from a low end to a high end within a predetermined range of frequencies that is based on the size of the passive controller system and predetermined distance between the active sensor system and the passive controller system. These parameters also determine the power consumption of the active sensor system. The disclosed embodiments herein beneficially provide a low power active sensor system. Furthermore, active sensor system is also configured to perform the tracking algorithms which process the reflected signals that are received by the one or more receivers.

Figure 12A:
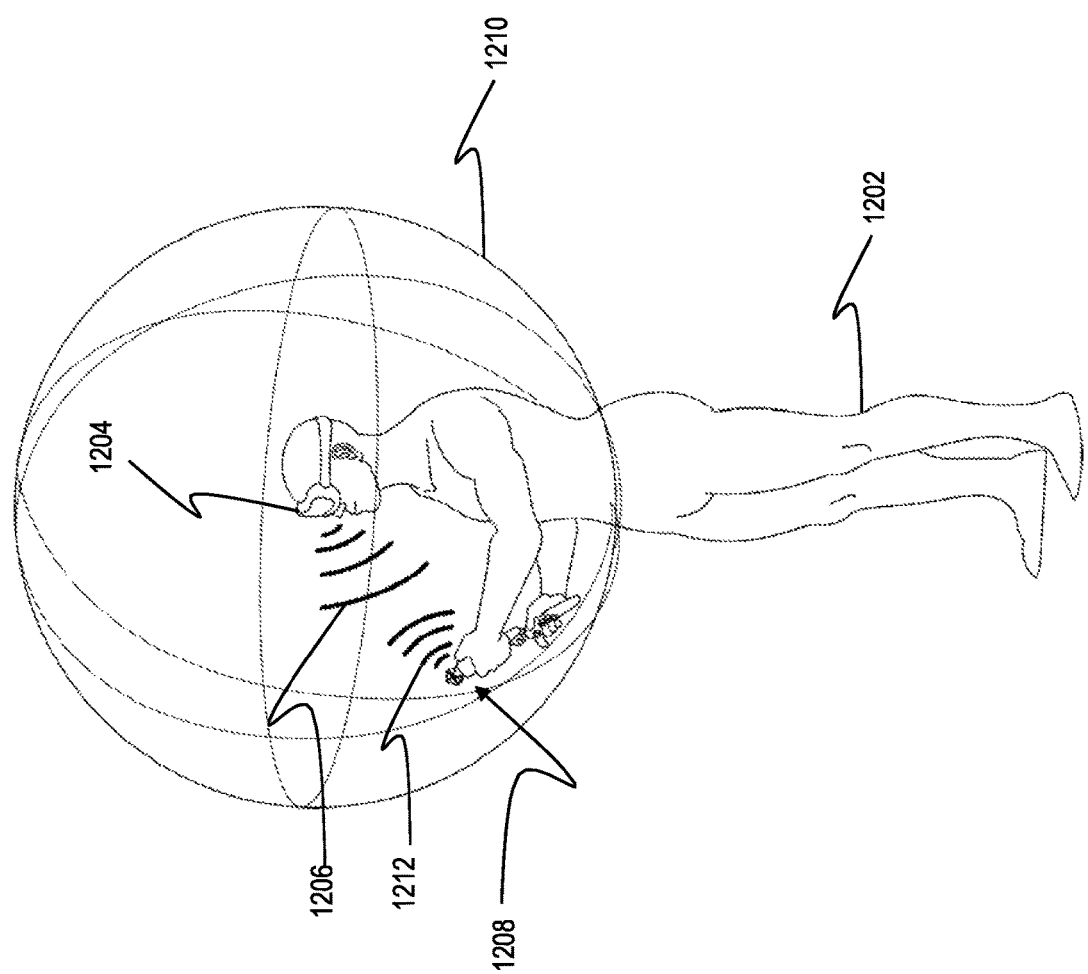
FIG. 12A illustrates an example embodiment of signal being generated from an active sensor system configured as a head-mounted device and being reflected back to the active sensor system by a passive controller system.

Attention will now be directed to FIG. 12A, which illustrates an example embodiment of signal being generated from an active sensor system configured as a head-mounted device and being reflected back to the active sensor system by a passive controller system. FIG. 12A shows a user 1202 wearing an active sensor system 1204 configured as an HMD. The active sensor system 1204 is configured to transmit one or more signals 1206 that are reflect-able back to the active sensor system 1204 (see reflected signal 1212) by a passive controller system 1208 being maneuvered by the user 1202 within a predetermined range 1210 relative to the active sensor system 1204.

In some embodiments, the predetermined range 1210 is a sphere, or part of a sphere (e.g., a hemisphere) having a predetermined radius. When there are physical limitations to a user's environment, the predetermined range is automatically truncated to prevent the user from trying to move the passive controller system 1208 into the unavailable spaces. The active sensor system is able to detect the different large objects int the user's environment (e.g., wall, another person, a desk, etc.) and track the passive controller system within the user's environment that is truncated based on the detected objects.

The predetermined range 1210 is customizable based on the size and surface area of the passive controller system. For example, a larger signal reflection surface area on the retroreflectors will allow for a larger predetermined range. Where the passive controller system 1208 is held by a user, typically the range of motion is limited to the length of the user's arms and flexibility of the various arm joints. Thus, the passive controller system 1208 is beneficially tuned to be optimized, lightweight and inexpensive based on the motion range of a typical user (e.g., see FIG. 3).

Figure 12B:
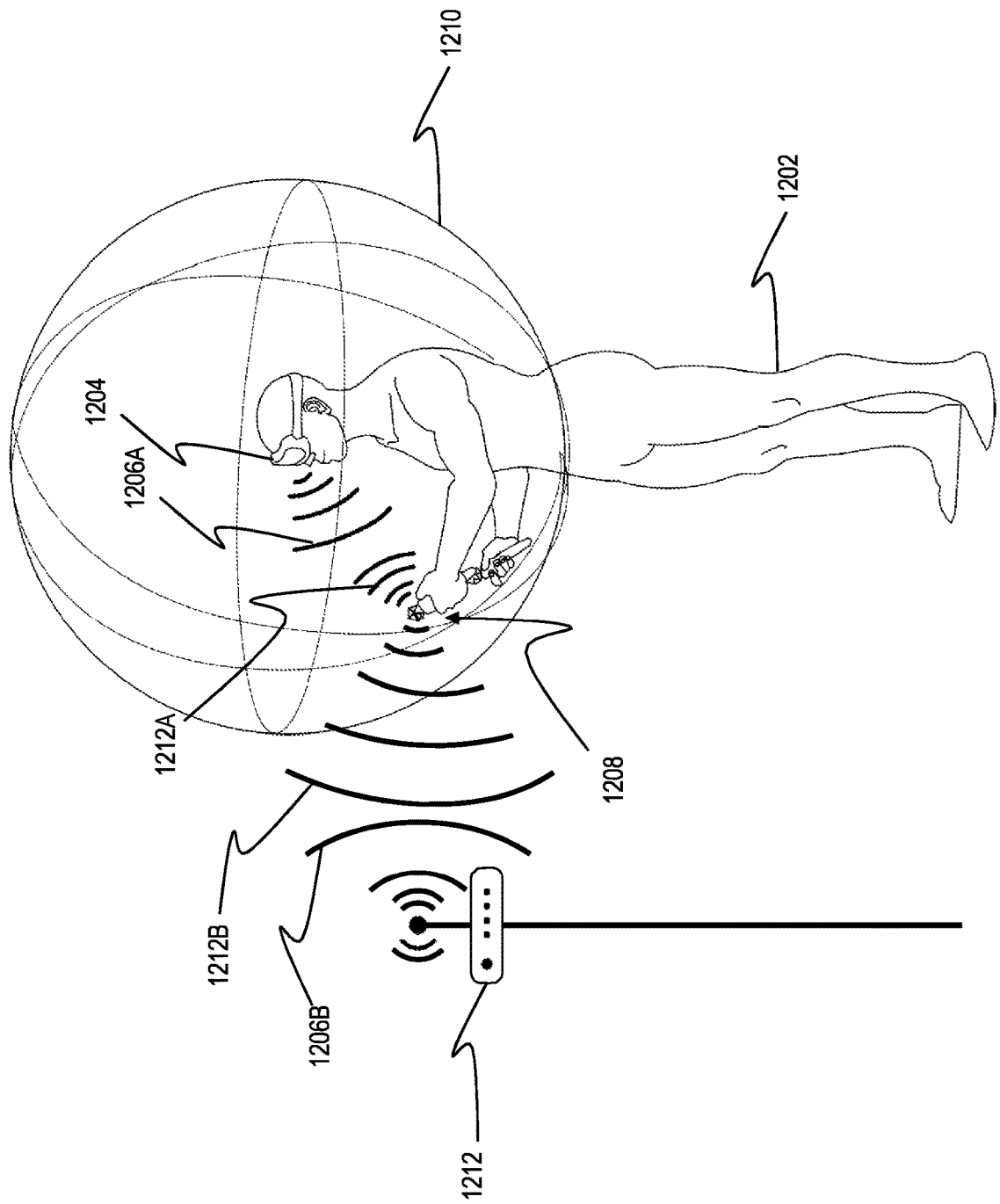
FIG. 12B illustrates an example embodiment of signal being generated from an active sensor system configured as a beacon and being reflected back to the active sensor system by a passive controller system.

Attention will now be directed to FIG. 12B, which illustrates an example embodiment of signal being generated from an active sensor system configured as a beacon and being reflected back to the active sensor system by a passive controller system. FIG. 12B shows a user 1202 wearing an active sensor system 1204 configured as an HMD. The active sensor system 1204 is configured to transmit one or more signals 1206A that are reflect-able back to the active sensor system 1204 (see reflected signal 1212A) by a passive controller system 1208 being maneuvered by the user 1202 within a predetermined range 1210 relative to the active sensor system 1204.

Additionally, or alternatively, the active sensor system 1204 comprises a beacon 1214 that is configured to transmit one or more signals 1206B which are reflect-able back to the beacon 1214 by the passive controller system 1208 (see reflected signal(s) 1212B). The beacon is configurable as a stand-alone active sensor system, or in communication with an HMD active sensor system. In some embodiments, the beacon is attachable to a top portion of a display such as a television being used to display a virtual reality. In other embodiments, the active sensor system 1204 comprises a plurality of beacons in order to track the passive controller system within a larger predetermined range 1210 or to accommodate for line-of-sight interruptions within the user's environment.

Figure 13:
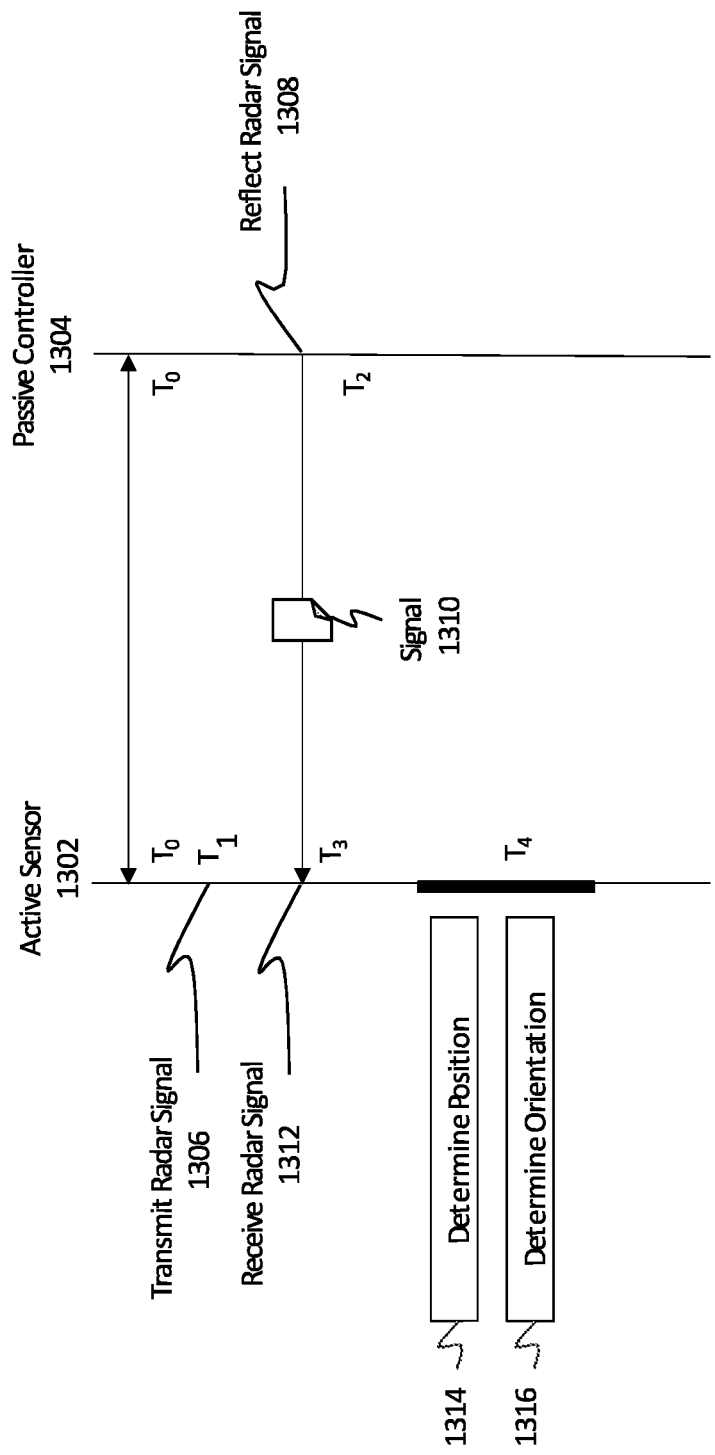
FIG. 13 illustrates another example embodiment of a process flow diagram for tracking a passive controller system using an active sensor system.

Attention will now be directed to FIG. 13, which illustrates another example embodiment of a process flow diagram for tracking a passive controller system using an active sensor system. For example, an active sensor 1302 is configured to transmit a radar signal 1306 in a direction that will reach the passive controller 1304 within a particular distance from the active sensor (e.g., transmit radar signal 1306). Irrespective of the position and/or orientation of the passive controller 1304 within the particular distance, the passive controller 1304 is configured to reflect the radar signal 1310 (e.g., reflect radar signal 1308). The active sensor 1302 then receives the reflected radar signal (e.g., receive radar signal 1312). Based on the transmitted radar signal and the received radar signal, the active sensor 1302 is configured to determine the position (e.g., determine position 1314) and determine the orientation (e.g., determine orientation 1316) of the passive controller system relative to the active sensor 1302.

Figure 14:
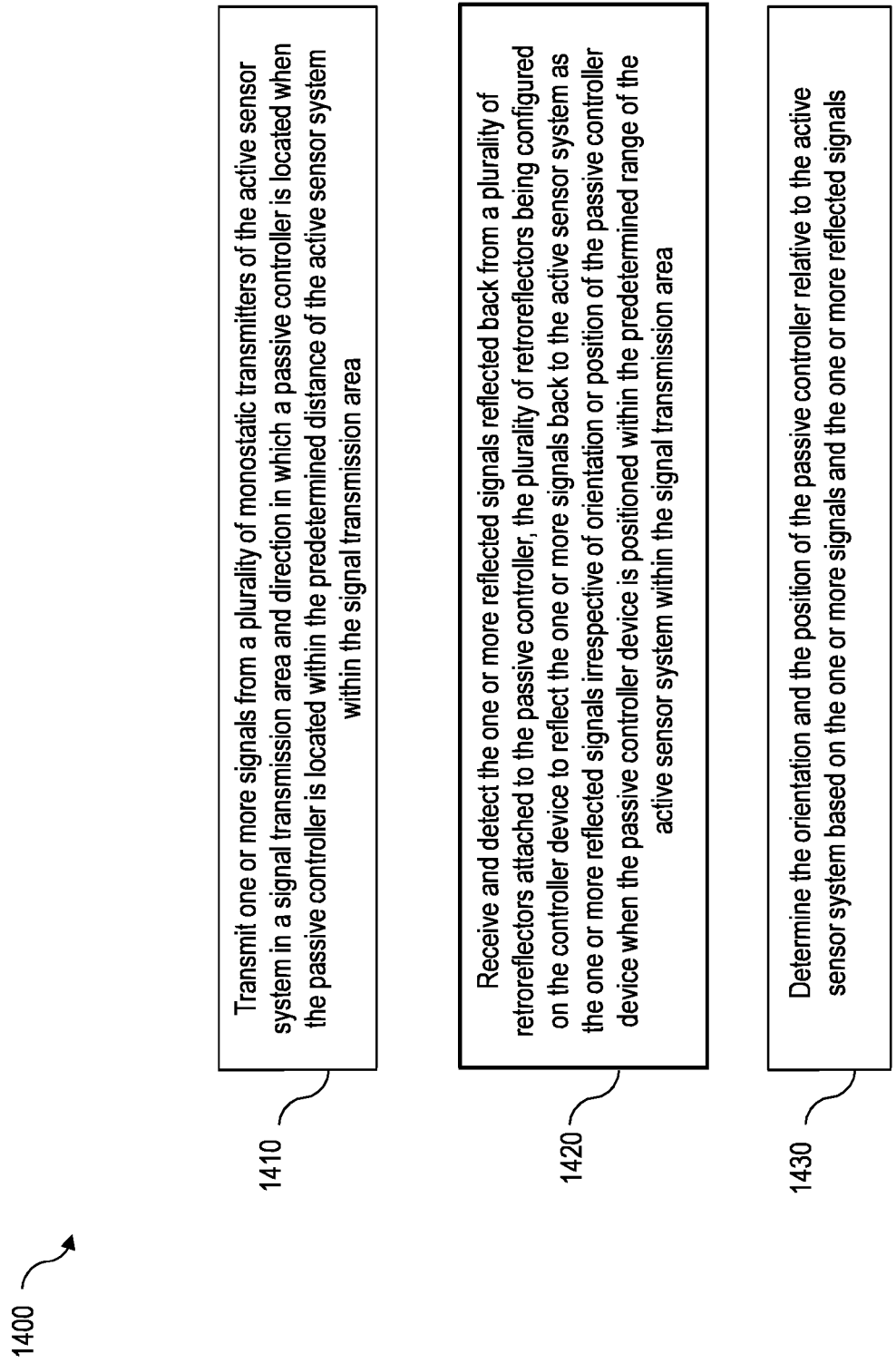
FIG. 14 illustrates a process flow diagram comprising a plurality of acts associated with a method for building a machine learning model configured to generate multimodal contrastive embeddings.

Attention will now be directed to FIG. 14, which illustrates an example embodiment of methods for performing the disclosed embodiments. Although the method acts may be discussed in a certain order or illustrated in a flow chart as occurring in a particular order, no ordering is required unless specifically stated, or required because an act is dependent on another act being completed prior to the act being performed.

FIG. 14, in some reference to FIG. 1, illustrates a flow diagram 1400 that includes various acts (act 1410, act 1420, and act 1430) associated with exemplary methods that can be implemented by computer system 1500 (see FIG. 15) for detecting an orientation and a position of a passive controller system relative to an active sensor system. As illustrated, the computing system first transmits the one or more signals from a plurality of monostatic transmitters of the active sensor system in a signal transmission area and a direction in which a passive controller system is located when the passive controller system is located within the predetermined distance of the active sensor system within the signal transmission area (act 1410).

The system then receives and detects the one or more reflected signals reflected back from a plurality of retroreflectors attached to the passive controller system (act 1420). The plurality of retroreflectors is configured on the passive controller system to reflect the one or more signals back to the active sensor system as the one or more reflected signals irrespective of orientation or position of the passive controller system when the passive controller system is positioned within the predetermined distance of the active sensor system within the signal transmission area.

The system determines the orientation and the position of the passive controller system relative to the active sensor system based on the one or more signals and the one or more reflected signals (act 1430). This determination is made by calculating the relative angles of the transmitted and detected reflected signals, as well as the timing of the signal transmissions and detected reflected signals. When there are multiple receivers being used, and multiple reflected signals are detected, the calculations can also include signal triangulation. When the originating/transmitted signals are transmitted from a first device and the reflected signals are detected by a second device (remote from the first device), the active sensor system (which incorporates both of the first and second device) can still calculate relative positioning of the passive controller based on an analysis of the transmitted signals and received/detected reflected signals.

In some instances, the calculation of the orientation and the position of the passive controller system relative to the active sensor system based on the one or more signals and the one or more reflected signals (act 1430) is performed by a single device (e.g., the HMD device or other device incorporating the active sensor system). In other embodiments, the signals are detected and provided to a server or remote system that performs the calculations to determine the relative orientation and position of the passive controller system relative to the active sensor system and/or the remote system (e.g., beacon).

In some embodiments, the system is also configured with and/or executes computer-readable instructions to configure the computing system to project a virtual object associated with the passive controller system based on the detected pose/orientation and/or position of the controller/controller system within a mixed-reality environment and/or based on the orientation and the position of the passive controller/controller system relative to the active sensor system.

In view of the foregoing, it will be appreciated that the disclosed embodiments provide many technical benefits over conventional systems and methods for tracking a passive controller system using retroreflectors configured to reflect a radio frequency signal back to a source of the radio frequency signal.

Example Computer/Computer Systems

Figure 15:
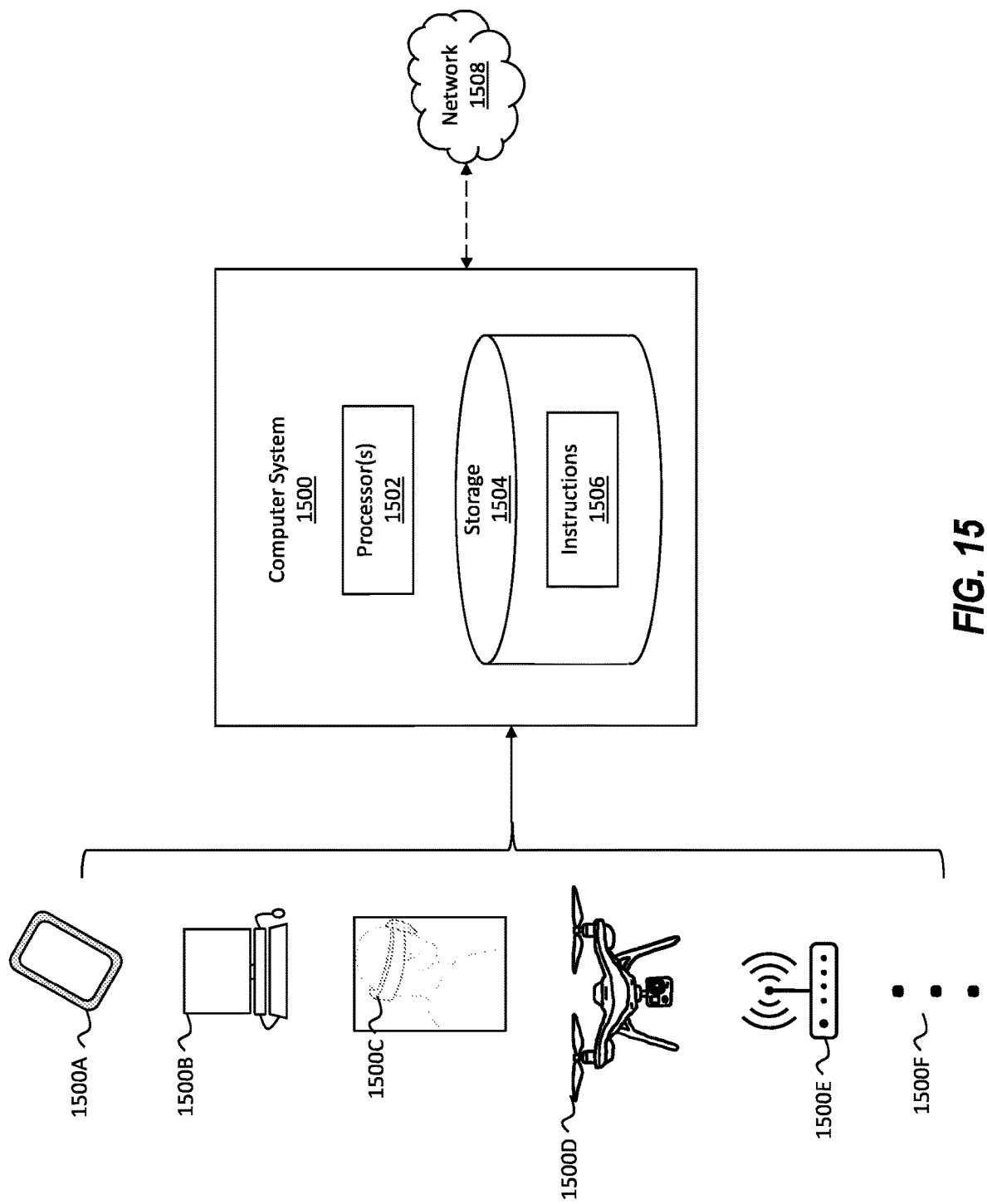
FIG. 15 illustrates an example architecture that includes a computing system that is capable of being utilized to implement the disclosed embodiments.

Attention will now be directed to FIG. 15 which illustrates an example computer system 1500 that may include and/or be used to perform any of the operations described herein. Computer system 1500 may take various different forms. For example, computer system 1500 may be embodied as a tablet 1500A, a desktop or a laptop 1500B, a wearable device (e.g., head-mounted device 1500C), a drone 1500D, vehicle or other mobile device (e.g., the active sensor system is able to be moved and guided through a space), a beacon 1500E (e.g., the active sensor system is external to a mixed-reality headset), a mixed-reality system device, and/or any other device, as illustrated by the ellipsis 1500F.

Computer system 1500 may also be configured as a standalone device or, alternatively, as a distributed system that includes one or more connected computing components/devices that are in communication with computer system 1500.

In its most basic configuration, computer system 1500 includes various different components. FIG. 15 shows that computer system 1500 includes one or more processor(s) 1502 (aka a "hardware processing unit") and storage 1504.

Regarding the processor(s) 1502, it will be appreciated that the functionality described herein can be performed, at least in part, by one or more hardware logic components (e.g., the processor(s) 1502). For example, and without limitation, illustrative types of hardware logic components/processors that can be used include Field-Programmable Gate Arrays ("FPGA"), Program-Specific or Application-Specific Integrated Circuits ("ASIC"), Program-Specific Standard Products ("ASSP"), System-On-A-Chip Systems ("SOC"), Complex Programmable Logic Devices ("CPLD"), Central Processing Units ("CPU"), Graphical Processing Units ("GPU"), or any other type of programmable hardware.

As used herein, the terms "executable module," "executable component," "component," "module," or "engine" can refer to hardware processing units or to software objects, routines, or methods that may be executed on computer system 1500. The different components, modules, engines, and services described herein may be implemented as objects or processors that execute on computer system 1500 (e.g., as separate threads).

Storage 1504 may be physical system memory, which may be volatile, non-volatile, or some combination of the two. The term "memory" may also be used herein to refer to non-volatile mass storage such as physical storage media. If computer system 1500 is distributed, the processing, memory, and/or storage capability may be distributed as well.

Storage 1504 is shown as including executable instructions 1506. The executable instructions 1506 represent instructions that are executable by the processor(s) 1502 of computer system 1500 to perform the disclosed operations, such as those described in the various methods.

The disclosed embodiments may comprise or utilize a special-purpose or general-purpose computer including computer hardware, such as, for example, one or more processors (such as processor(s) 1502) and system memory (such as storage 1504), as discussed in greater detail below. Embodiments also include physical and other computer-readable media for carrying or storing computer-executable instructions and/or data structures. Such computer-readable media can be any available media that can be accessed by a general-purpose or special-purpose computer system.

Computer-readable media that store computer-executable instructions in the form of data are physical or hardware computer storage media or device(s). Computer-readable media that merely carry computer-executable instructions are transitory media or transmission media. Thus, by way of example and not limitation, the current embodiments can comprise at least two distinctly different kinds of computer-readable media: (1) computer-readable hardware storage media and (2) transitory transmission media that does not include hardware storage.

The referenced computer storage device(s) (aka "hardware storage device(s)") comprise hardware storage components/devices, such as RAM, ROM, EEPROM, CD-ROM, solid state drives ("SSD") that are physical and tangible and that are based on RAM, Flash memory, phase-change memory ("PCM"), or other types of memory, or other optical disk storage, magnetic disk storage or other magnetic storage devices, or any other medium that can be used to store desired program code means in the form of computer-executable instructions, data, or data structures and that can be accessed by a general-purpose or special-purpose computer and which are distinguished from mere carrier waves and signals.

Computer system 1500 may also be connected (via a wired or wireless connection) to external sensors (e.g., one or more remote cameras) or devices via a network 1508. For example, computer system 1500 can communicate with any number devices or cloud services to obtain or process data. In some cases, network 1508 may itself be a cloud network. Furthermore, computer system 1500 may also be connected through one or more wired or wireless networks 1508 to remote/separate computer systems(s) that are configured to perform any of the processing described with regard to computer system 1500.

A "network," like network 1508, is defined as one or more data links and/or data switches that enable the transport of electronic data between computer systems, modules, and/or other electronic devices. When information is transferred, or provided, over a network (either hardwired, wireless, or a combination of hardwired and wireless) to a computer, the computer properly views the connection as a transmission medium. Computer system 1500 will include one or more communication channels that are used to communicate with the network 1508. Transmission media include a network that can be used to carry data or desired program code means in the form of computer-executable instructions or in the form of data structures. Further, these computer-executable instructions can be accessed by a general-purpose or special-purpose computer. Combinations of the above should also be included within the scope of computer-readable media.

Upon reaching various computer system components, program code means in the form of computer-executable instructions or data structures can be transferred automatically from transmission media to computer storage media (or vice versa). For example, computer-executable instructions or data structures received over a network or data link can be buffered in RAM within a network interface module (e.g., a network interface card or "NIC") and then eventually transferred to computer system RAM and/or to less volatile computer storage media at a computer system. Thus, it should be understood that computer storage media can be included in computer system components that also (or even primarily) utilize transmission media.

Computer-executable (or computer-interpretable) instructions comprise, for example, instructions that cause a general-purpose computer, special-purpose computer, or special-purpose processing device to perform a certain function or group of functions. The computer-executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the embodiments may be practiced in network computing environments with many types of computer system configurations, including personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, and the like. The embodiments may also be practiced in distributed system environments where local and remote computer systems that are linked (either by hardwired data links, wireless data links, or by a combination of hardwired and wireless data links) through a network each perform tasks (e.g., cloud computing, cloud services and the like). In a distributed system environment, program modules may be located in both local and remote memory storage devices.

The present invention may be embodied in other specific forms without departing from its characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A passive controller system comprising:
a body configured to be held in a hand of a user and to be moved with the hand of the user in six degrees of freedom the body comprising a top portion and a handle base; and
a plurality of retroreflectors attached to the body in a configuration that provides at least 180 degrees of reflecting surface for reflecting a radar signal in at least 180 degrees of spherical range when the passive controller system is positioned within a predetermined distance from a source of the radar signal with an orientation that is within the at least 180 degrees of spherical range relative to the source of the radar signal, the plurality of retroreflectors comprising:
a first set of retroflectors configured as a single discrete and integrally connected retroreflector assembly disposed within the top portion of the body, and
a second set of retroreflectors that are physically separated from each other and distributed throughout the handle base of the body at a different angular alignment to provide different angles of reflection.

2. The passive controller system of claim 1, wherein the predetermined distance within a range of about 0.01 meters to about 4 meters.

3. The passive controller system of claim 1, wherein the plurality of retroreflectors is encapsulated within a housing of the body and such that the plurality of retroreflectors is not externally visible from the body.

4. The passive controller system of claim 1, wherein the passive controller system omits any active sensor device and is capable of reflecting the radar signal with the plurality of retroreflectors to a receiver that translates reflected signals from the plurality of retroreflectors to determine a relative position and an orientation of the passive controller system relative to the receiver.

5. The passive controller system of claim 1, wherein the passive controller system omits any inertial measurement unit.

6. The passive controller system of claim 1, wherein the plurality of retroreflectors is attached to the body in a configuration that provides 360 degrees of reflecting surface, for facilitating reflection of the radar signal, irrespective of the orientation of the body relative to the source of the radar signal within the predetermined distance.

7. The passive controller system of claim 6, wherein each side of at least one retroreflector of the plurality of retroreflectors is in direct contact with a different retroreflector of the plurality of retroreflectors.

8. The passive controller system of claim 7, wherein the plurality of retroreflectors comprises a single integrated reflector unit that is detachably connected to the body.

9. The passive controller system of claim 1, wherein the plurality of retroreflectors is distributed throughout a handle base of the body and such that the plurality of retroreflectors includes at least two different retroreflectors that are connected to the body while being separated from each other by at least a space in the body or a physical structure of the body.

10. The passive controller system of claim 9, wherein one or more retroflectors of the plurality of retroreflectors is attachable to the handle base at different locations of the handle base.

11. The passive controller system of claim 9, wherein a first angle of reflection of a first retroreflector of the plurality of retroreflectors overlaps with a second angle of reflection of a second retroreflector of the plurality of retroreflectors.

12. The passive controller system of claim 9, wherein each retroreflector of the plurality of retroreflectors is attached to the body such that an angle of reflection of each retroreflector is a unique angle of reflection that is non-overlapping with angles of reflection of at least two different retroreflectors in the plurality of retroreflectors.

13. The passive controller system of claim 1, wherein each retroreflector of the plurality of retroreflectors is composed of a same material.

14. The passive controller system of claim 1, wherein each retroreflector comprises at least three orthogonally connected planes.

15. The passive controller system of claim 1, wherein each retroreflector of the plurality of retroreflectors comprises a substantially similar surface area and dimensional size.

* * * * *